(12) United States Patent
Igari et al.

(10) Patent No.: US 7,539,356 B2
(45) Date of Patent: May 26, 2009

(54) IMAGE PROCESSING DEVICE, IMAGE PROCESSING METHOD, RECORDING MEDIUM, AND PROGRAM

(75) Inventors: Tatsuya Igari, Kanagawa (JP); Kiyotake Yachi, Tokyo (JP)

(73) Assignee: Sony Corporation, Tokyo (JP)

( * ) Notice: Subject to any disclaimer, the term of this patent is extended or adjusted under 35 U.S.C. 154(b) by 556 days.

(21) Appl. No.: 10/529,480

(22) PCT Filed: Sep. 18, 2003

(86) PCT No.: PCT/JP03/11869

§ 371 (c)(1),
(2), (4) Date: Mar. 28, 2005

(87) PCT Pub. No.: WO2004/032055

PCT Pub. Date: Apr. 15, 2004

(65) Prior Publication Data

US 2006/0008176 A1    Jan. 12, 2006

(30) Foreign Application Priority Data

Sep. 30, 2002 (JP) .............................. 2002-284974

(51) Int. Cl.
G06K 9/36 (2006.01)
G06K 9/32 (2006.01)
G09G 5/00 (2006.01)
H04N 9/74 (2006.01)

(52) U.S. Cl. ....................... 382/284; 382/294; 382/296; 345/629; 348/584

(58) Field of Classification Search ................. 382/284, 382/294; 345/629–641; 348/584–601
See application file for complete search history.

(56) References Cited

U.S. PATENT DOCUMENTS 5,465,163 A * 11/1995 Yoshihara et al. ............ 358/444

(Continued)

OTHER PUBLICATIONS

Sandini et al., "Omniviews: direct omnidirectional imaging based on a retina-like sensor", Proceedings of IEEE Sensors 2002, vol. 1 Jun. 12-14, 2002, pp. 27-30.*

(Continued)

*Primary Examiner*—Jingge Wu
*Assistant Examiner*—Jose M Torres
(74) *Attorney, Agent, or Firm*—Finnegan, Henderson, Farabow, Garrett & Dunner, L.L.P.

(57) ABSTRACT

The present invention relates to an image processing apparatus and method thereof, a recording medium, and a program that is able to adjust precisely overlap portion of an omnidirectional picture. By detecting overlap portions of adjacent pictures forming an omnidirectional picture in a direction of a visual line, respective is processed by a Laplacian filter, and they are converted into pictures formed by edges. The mutually most nearest distance between a picture of the edge of the first picture denoted by black circle and a picture of the edge of the second picture denoted by white circle, and these sum is obtained as edge differences. By repeating the similar processing while shifting the pictures so that the edge differences becomes smaller than a predetermined threshold value, the first picture and the second picture are precisely set. This invention is able to adapt to an omnidirectional camera.

3 Claims, 24 Drawing Sheets

U.S. PATENT DOCUMENTS

| | | | |
|---|---|---|---|
| 6,075,905 A * | 6/2000 | Herman et al. | 382/284 |
| 6,205,259 B1 * | 3/2001 | Komiya et al. | 382/284 |
| 6,393,162 B1 * | 5/2002 | Higurashi | 382/284 |
| 6,813,391 B1 * | 11/2004 | Uyttendaele et al. | 382/284 |
| 6,961,478 B2 * | 11/2005 | Inoue | 382/284 |

OTHER PUBLICATIONS

Szeliski, "Video Mosaics for Virtual Environments", IEEE Computer Graphics and Applications, vol. 16, Issue 2, Mar. 1996, pp. 22-30.*

* cited by examiner

Fig. 20

| 1 | 1 | 1 |
|---|---|---|
| 1 | −8 | 1 |
| 1 | 1 | 1 |

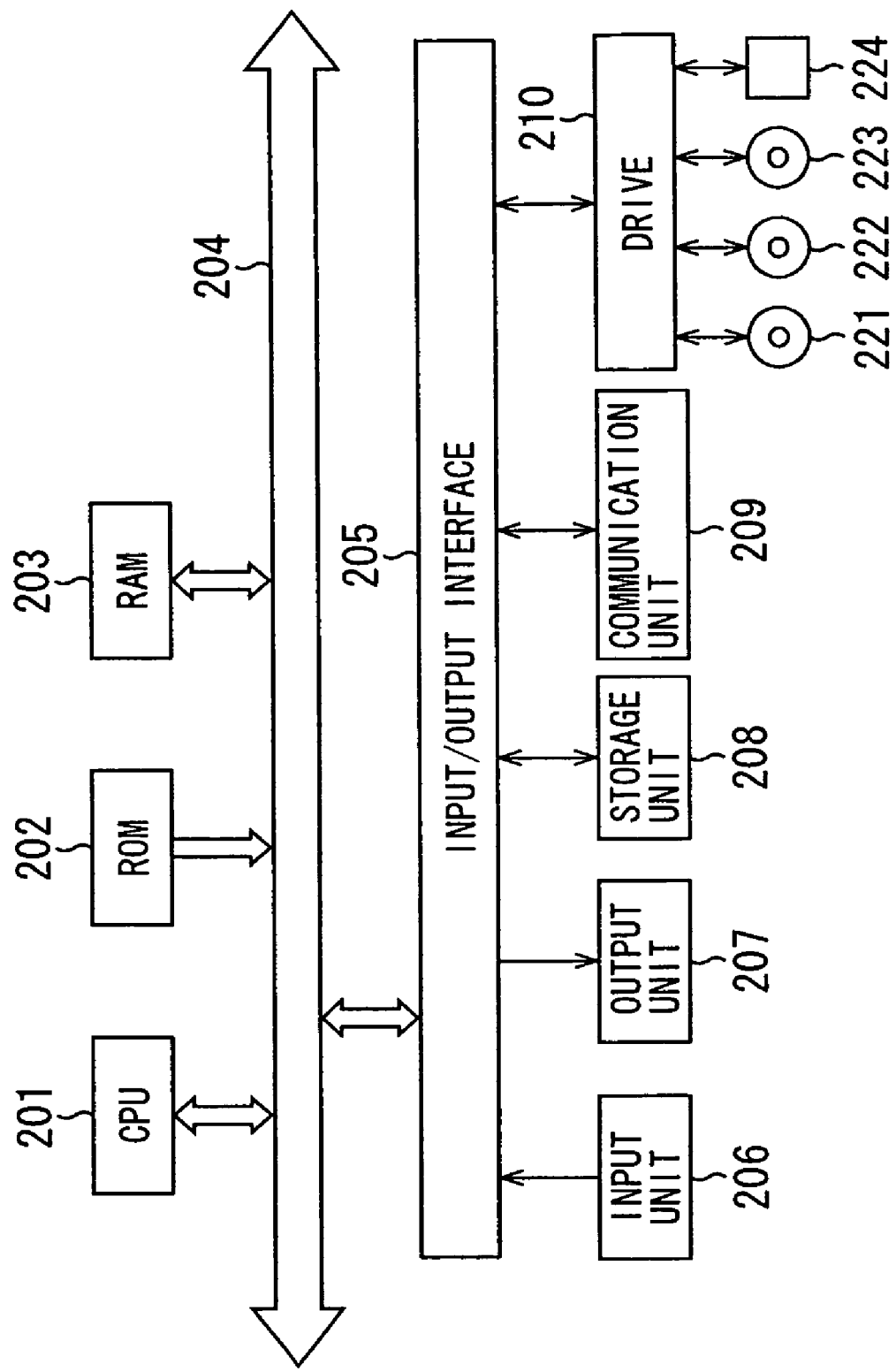

IMAGE PROCESSING DEVICE, IMAGE PROCESSING METHOD, RECORDING MEDIUM, AND PROGRAM

TECHNICAL FIELD

The present invention relates to an image processing apparatus, an image processing method, a recording medium and a program, and more particularly, relates to an image processing apparatus, an image processing method, a recording medium and a program that is able to generate an omnidirectional image by exactly overlapping edges of pictures captured at a plurality of visual points.

BACKGROUND ART

A technology of capturing, with a prescribed position as the center, pictures in all directions radiating from the prescribed positions at a plurality of visual points to generate an omnidirectional image by sequentially splicing (pasting) the pictures of the adjacent visual points has been generally widespread.

The omnidirectional image generated as described the above is able to be displayed as an arbitrary directional image observed at the prescribed position by specifying an arbitrary view angle.

Further, some conventional image processing apparatuses suggest a synthesis through an adjustment suitable for a minimization of a difference in shading between two pictures (See Japanese Laid-Open Patent No. Hei 11-102430, for instance).

By the way, the above omnidirectional image has presented a problem in that when a spliced portion is contained in a range of a specified view angle, for instance, in a case of no exact splicing of the edges of the respective pictures in the omnidirectional image, that is, an occurrence of a misalignment in the spliced portion, an execution of a display of the spliced portion suffering the misalignment causes an image giving a sense of inconsistency to a viewer to be displayed.

However, a method of confirming whether or not the splicing is in the process of being performed exactly is generally to apply, to all frames, a processing of performing the splicing while shifting, after a confirmation of all the spliced portions contained in one frame (one of 30 frames displayed in one second) with the eye, and further, there has been a problem that it takes much time to form the omnidirectional image through a correction of a misalignment width.

DISCLOSURE OF THE INVENTION

The present invention has been undertaken in view of the above circumstances, and is intended to be able to generate an omnidirectional image by exactly overlapping edges of pictures captured at a plurality of visual points.

An image processing apparatus according to the present invention is characterized by having detecting means of detecting an overlap portion of a first picture with a second picture within a wide-angle picture, comparing means of comparing pixel values between pixels of the first and the second pictures in the overlap portion, and splicing means of performing a splicing by shifting the overlap portion of the first picture with the second picture in correspondence with a result of the comparison by the comparing means.

The above image processing apparatus may further have difference calculating means of calculating absolute values of differences in pixel values between the first and the second picture pixels identical in position on the wide-angle pictures in the overlap portion, permitting the comparing means to compare the pixel values between the pixels of the first and the second pictures in the overlap portion by comparing the absolute values, calculated by the difference calculating means, of the differences in pixel values between the first and the second picture pixels identical in position on the wide-angle pictures in the overlap portion with a prescribed threshold.

The image processing apparatus may be set to further have logarithm transformation means of performing a logarithm transformation of the absolute values of the differences in pixel values between the first and the second picture pixels identical in position on the wide-angle pictures in the overlap portion, permitting the comparing means to compare the pixel values between the pixels of the first and the second pictures in the overlap portion by comparing a value obtained by the logarithm transformation means through the logarithm transformation of the absolute values of the differences in pixel values between the first and the second picture pixels identical in position on the wide-angle pictures in the overlap portion with a predetermined threshold.

The image processing apparatus may be set to further have median detecting means of calculating medians within the absolute values of the differences in pixel values between the first and the second picture pixels identical in position on the wide-angle pictures in the overlap portion, permitting the comparing means to compare the pixel values between the pixels of the first and the second pictures in the overlap portion by comparing the medians, detected by the median detecting means, within the absolute values of the differences in pixel values between the first and the second picture pixels identical in position on the wide-angle pictures in the overlap portion with a prescribed threshold.

The image processing apparatus may be set to further have edge extracting means of extracting edges from the first and the second pictures, permitting the comparing means to compare the pixel values between the pixels of the first and the second pictures in the overlap portion by comparing the edges, extracted by the edge extracting means, of the first and the second pictures in the overlap portion.

An image processing method according to the present invention is characterized by including a detection step of detecting an overlap portion of a first picture with a second picture within wide-angle pictures, a comparison step of comparing pixel values between pixels of the first and the second pictures in the overlap portion, and a splicing step of performing a splicing through a shifting of the overlap portion of the first picture with the second picture in correspondence with a result of comparison obtained by a processing in the comparison step.

A program of a recording medium according to the present invention is characterized by including a detection control step of controlling a detection of an overlap portion of a first picture with a second picture within wide-angle pictures, a comparison control step of controlling a comparison of pixel values between pixels of the first and the second pictures in the overlap portion, and a splicing control step of controlling a splicing performed through a shifting of the overlap portion of the first picture with the second picture in correspondence with a result of comparison obtained by a processing in the comparison control step.

A program according to the present invention is characterized by executing a detection control step of controlling a detection of an overlap portion of a first picture with a second picture within wide-angle pictures, a comparison control step of controlling a comparison of pixel values between pixels of the first and the second pictures in the overlap portion and a splicing control step of controlling a splicing performed through a shifting of the overlap portion of the first picture with the second picture in correspondence with a result of comparison obtained by a processing in the comparison control step.

In the image processing apparatus, the image processing method and the program according to the present invention, the overlap portion of the first picture with the second picture within the wide-angle pictures is detected, the pixel values between the pixels of the first and the second pictures in the overlap portion are compared, and the splicing is performed through the shifting of the overlap portion of the first picture with the second picture in correspondence with the result of comparison.

BRIEF DESCRIPTION OF THE DRAWINGS

FIG. 20 is a view for illustrating a Laplacian filter.

FIG. 25 is a view for illustrating a recording medium.

BEST MODE FOR CARRYING OUT THE INVENTION

Figure 1:
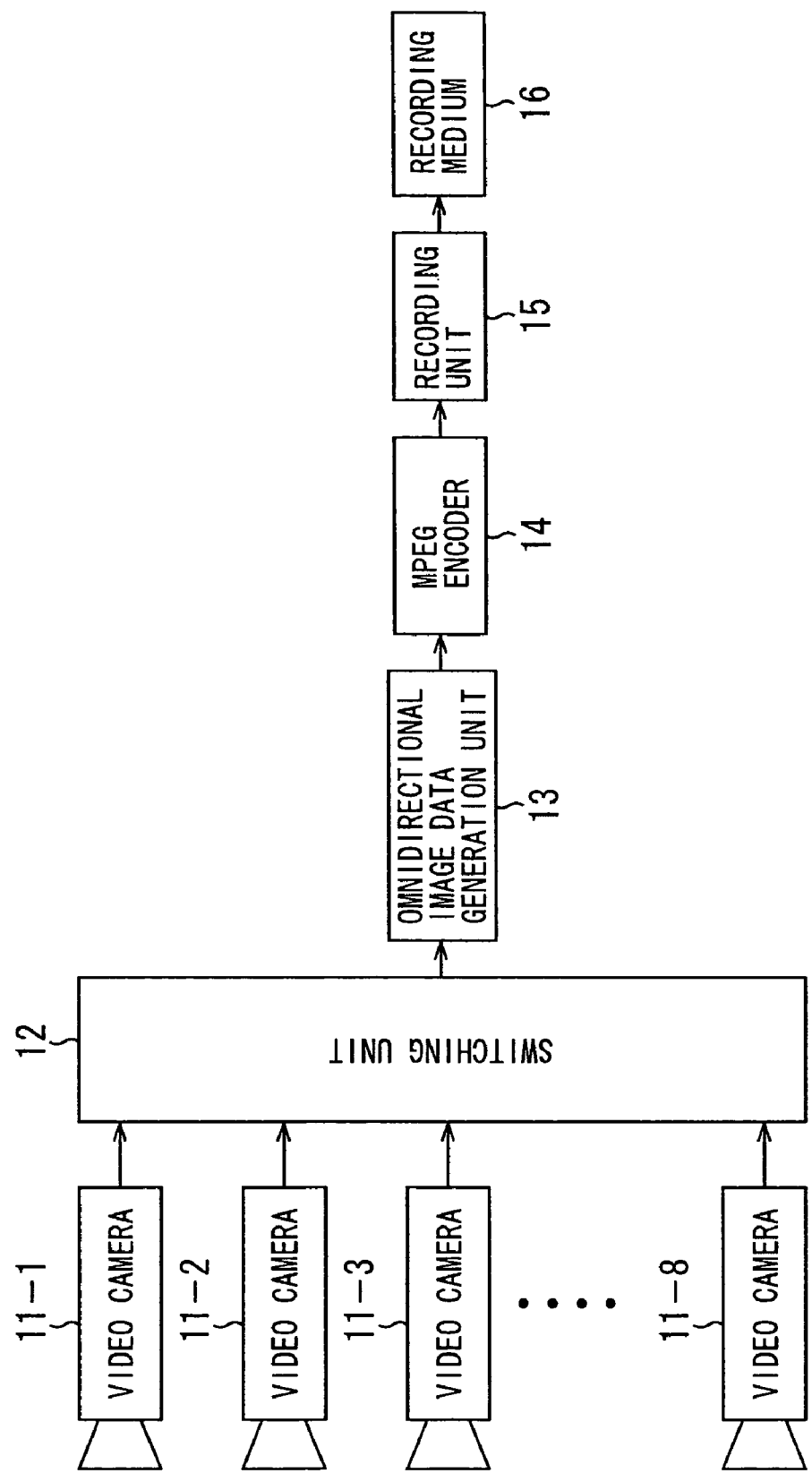
FIG. 1 is a block diagram showing a configuration of an omnidirectional camera obtained by an application of the present invention.

FIG. 1 is a block diagram showing a configuration of one embodiment of an omnidirectional camera according to the present invention.

Figure 2:
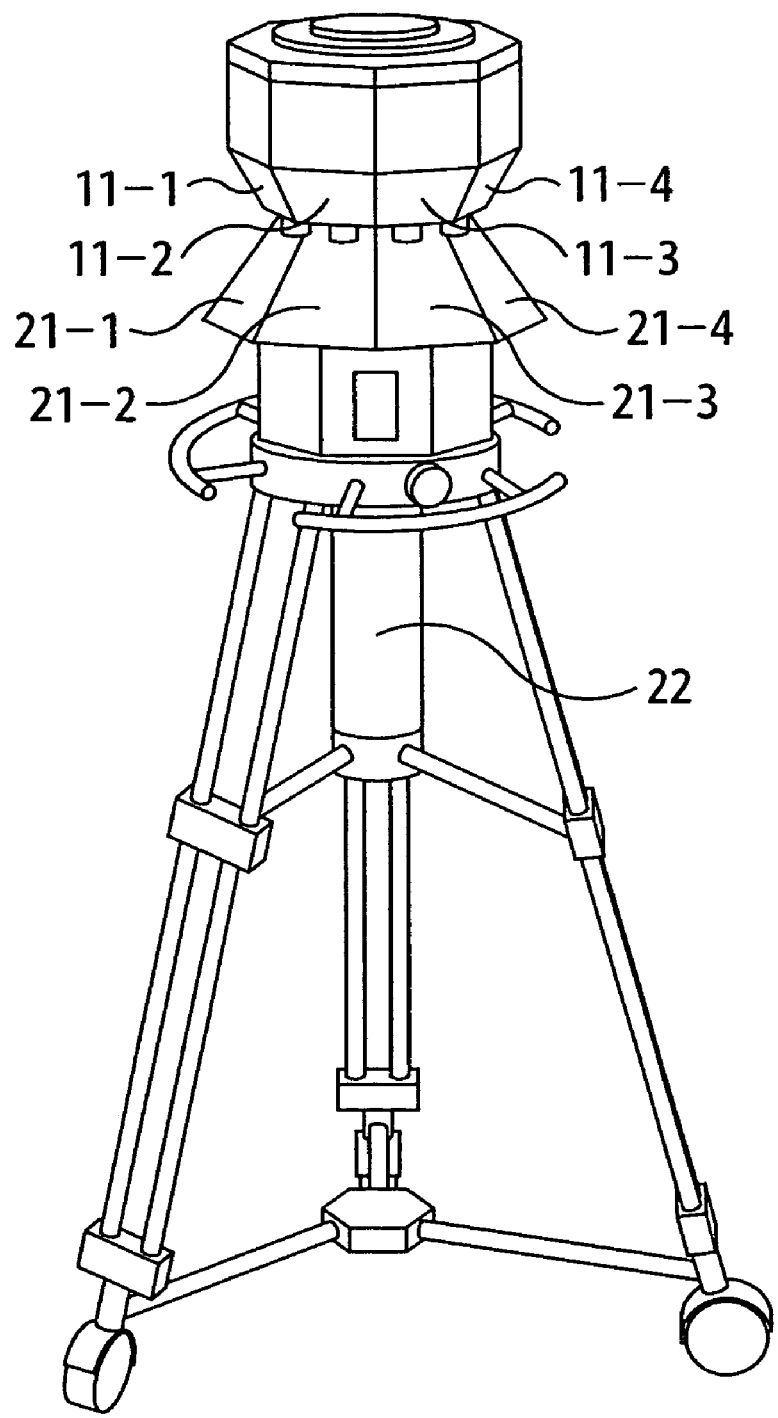
FIG. 2 is a perspective view showing the omnidirectional camera obtained by the application of the present invention.

Video cameras 11-1 to 11-8 are spaced at approximately equal intervals of about 45 degrees on a circumference as shown in FIG. 2, for instance, and perform a capturing of pictures in all directions from 8 visual points through reflection units 21-1 to 21-8 formed with plane mirrors respectively disposed at positions corresponding to the video cameras, and an output of each video camera is supplied to a switching unit 12. More specifically, the video cameras 11-1 to 11-8 are arranged in alignment with an approximately center portion of a pedestal 22 in a vertical direction in the drawing with reference to lines of sight of the video cameras, and further, the lines of sight of the video cameras 11-1 to 11-8 are spaced at intervals of a prescribed angle (about 45 degrees) on a horizontal plane.

Incidentally, the video cameras 11-1 to 11-8 are hereinafter referred to simply as the video cameras 11, when there is no need to make a differentiation of these video cameras in particular, and the same is also applied to other portions.

The video cameras 11-1 to 11-8 output, to the switching unit 12, a horizontally 360-degree image provided in the form of a mirror image by capturing peripheral background pictures reflected by the reflection units 21-1 to 21-8 respectively corresponding to the video cameras. Further, the video cameras 11-1 to 11-8 output 8 streams (images and voices) in total in the form of bit-map files to the switching unit 12 through a video capture board not illustrated in the figure.

The switching unit 12 outputs, in time series to an omnidirectional image data generation unit 13, the stream supplied from each of the video cameras 11-1 to 11-8, after properly storing the stream for a correction of distortion of a lens corresponding to each video camera 11.

The omnidirectional image data generation unit 13 generates omnidirectional image data using stream data sequentially supplied in a switched manner from the switching unit 12, and outputs the omnidirectional image data to a MPEG (Moving Picture Experts Group) encoder 14. Incidentally, the omnidirectional image generation unit 13 is described later in detail.

Figure 3:
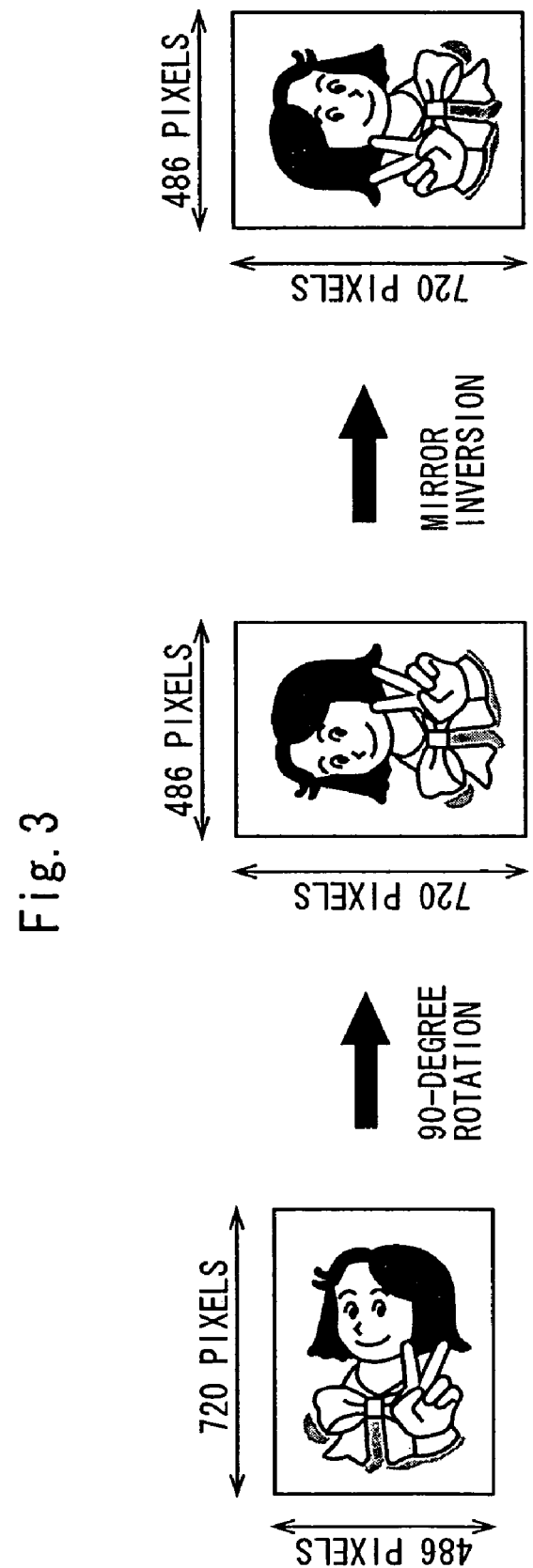
FIG. 3 is a view for illustrating a 90-degree rotation and a mirror inversion.

With the configuration of the omnidirectional camera shown in FIGS. 1 and 2, the picture captured by each video camera 11 is recorded in the form of an image rotated by 90 degrees. For reasons that a relation in view angle (an angle in a direction of an arbitrary visual point as viewed from a prescribed reference visual point) of the video cameras 11 should accord with the visual points of the 8 video cameras 11, a processing such as a 90-degree rotation and a mirror inversion is applied as shown in FIG. 3, before the 8 streams are spliced together. Further, the omnidirectional image data generation unit 13 is supposed, at a time when the capturing is completed, to generate, in the form of a SD (Standard Definition)-type still image composed of 720 by 486 pixels, one frame image in one stream.

The MPEG encoder 14 MPEG2-compresses and outputs the supplied omnidirectional image data to a recording unit

15. The recording unit 15 records, in a recording medium 16, the MPEG-compressed omnidirectional image data supplied from the MPEG encoder 14.

An operation of the omnidirectional camera is now described.

A bit-map image for one frame is obtained by the video cameras 11-1 to 11-8 through the capturing of the picture at the visual point of each video camera and is outputted to the switching unit 12. The switching unit 12 outputs the supplied bit-map image for one frame to the omnidirectional image data generation unit 13 through the correction of the lens distortion for each video camera 11.

The omnidirectional image data generation unit 13 generates the omnidirectional image data from the supplied 8 streams and outputs the omnidirectional image data to the MPEG encoder 14.

Figure 4:
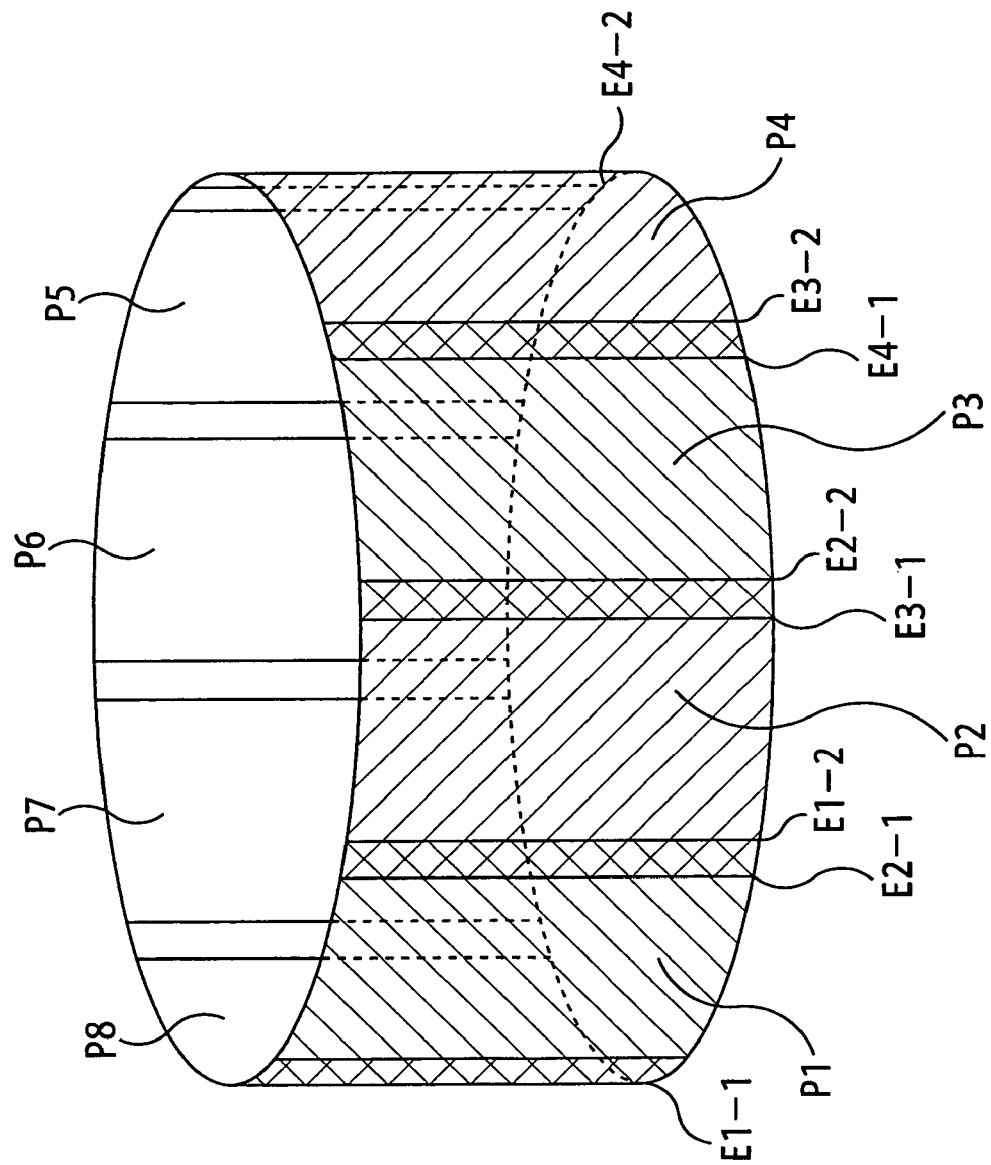
FIG. 4 is a view for illustrating an omnidirectional image.

More specifically, the pictures captured by the video cameras 11-1 to 11-8 are in the form of a gathered wide-angle picture generated by splicing, edge to edge, the pictures captured at more than one visual point set in a radial shape with a prescribed axis as the center as shown in FIG. 4 such that respective portions (edges) overlap each other, permitting an omnidirectional image to be formed through a formation into an image as wide as 360 degrees with the axis as the center.

In FIG. 4, pictures P1 to P8 represent pictures having basically the same time-code captured respectively by the video cameras 11-1 to 11-8. Incidentally, the pictures P1, P2, P3, and P4 cover respectively the ranges of edges from E1-1 to E1-2, from E2-1 to E2-2, from E3-1 to E3-2, and from E4-1 to E4-2 in a horizontal direction, and the same is also applied to the pictures P5 to P8. Alternatively, when no picture having the same time-code exists, pictures having the time-codes about that time are supposed to be substituted.

Thus, there are provided the visual points set up to meet an overlapping (the splicing) such that an image in the range of the edges from E2-1 to E1-2 of the picture P1 is the same image as that in the range of the edges from E2-1 to E1-2 of the picture P2, and an image in the range of the edges from E3-1 to E2-2 of the picture P2 is the same image as that in the range of the edges from E3-1 to E2-2 of the picture P3 (the same is also applied to each of the pictures P4 to P8). For this reason, a continuous omnidirectional image may be formed. Incidentally, a width of a splicing portion (which will be hereinafter referred to also as an overlap portion) is adjusted by an adjusting method as described later such that the pictures at the mutually splicing edges coincide.

Figure 5:
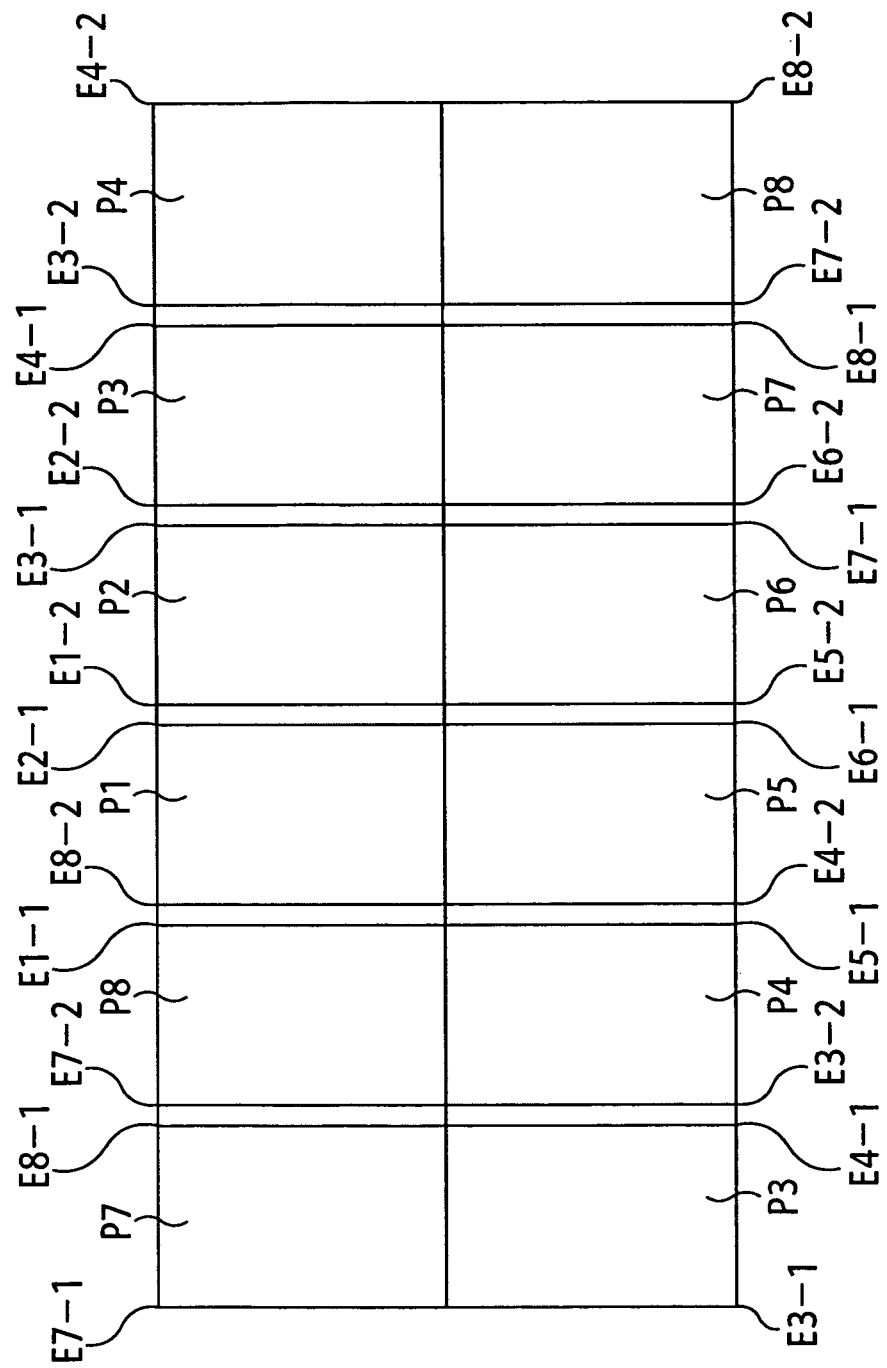
FIG. 5 is a view for illustrating omnidirectional image data.

The omnidirectional image data generation unit 13 forms the omnidirectional image data by splicing, together into a sheet of frame as shown in FIG. 5, the pictures P1 to P8 available to form the omnidirectional image in this manner, after the 90-degree rotation and the mirror inversion of each picture as shown in FIG. 3, and outputs the omnidirectional image data to the MPEG encoder 14.

That is, as shown in FIG.5, one frame is supposed to contain the pictures P7, P8, P1, P2, P3, and P4 arranged from the left at an upper stage in the drawing, and the pictures P3, P4, P5, P6, P7, and P8 arranged from the left at a lower stage in the drawing. Originally, it is merely necessary for a formation of the omnidirectional image data that each picture in the range of P1 to P8 should be contained one at a time. However, a configuration obtained with the pictures P1 to P4 arranged at the upper stage and the pictures P5 to P8 arranged at the lower stage, for instance, causes splicing portion (the overlap portion) of the picture P4 with the picture P5 to be not contained in the omnidirectional image, resulting in an image giving the sense of inconsistency when the view angle as much as being across a boundary between the pictures P4 and P5 is specified in performing a reproduction of the omnidirectional image while changing the view angle continuously. Thus, a configuration as shown in FIG. 5 is adopted to ensure that information on the spliced portions (the overlap portions) where the pictures overlap each other is contained without exception, and the image giving no sense of inconsistency is obtained in the case of the reproduction of the omnidirectional image with a change of the view angle. Incidentally, details of an operation of the omnidirectional image data generation unit 13 are described later.

The MPEG encoder 14 sequentially MPEG2-compresses and outputs, in the form of the image data for one frame as shown in FIG. 5 to the recording unit 15, the omnidirectional image data generated by the omnidirectional image data generation unit 13.

The recording unit 15 causes the MPEG2-compressed omnidirectional image data supplied from the MPEG encoder 14 to be sequentially recorded in the recording medium 16.

As described the above, a use of the omnidirectional camera of FIG. 1 makes it possible to generate and record the omnidirectional image based on the pictures captured at more then one visual point.

Figure 6:
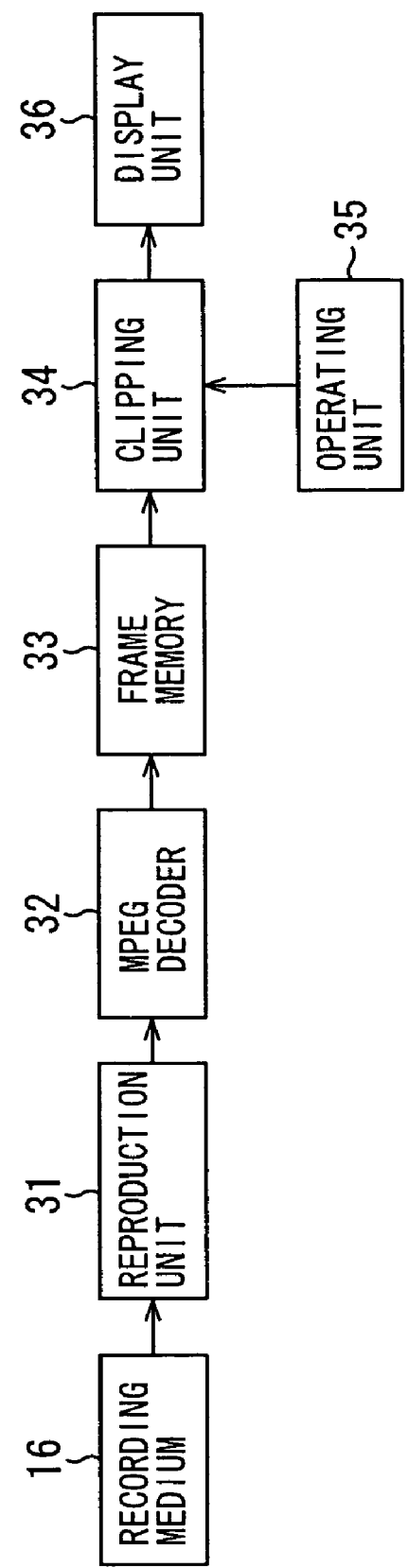
FIG. 6 is a block diagram showing a configuration of a reproducing apparatus for reproducing the omnidirectional image data.

A reproducing apparatus for reproducing the omnidirectional image recorded in the recording medium 16 by the omnidirectional camera of FIG. 1 is now described with reference to FIG. 6.

A reproduction unit 31 reads out and outputs, to a MPEG decoder 32, the MPEG2-compressed omnidirectional image data contained in the recording medium 16. The MPEG decoder 32 decodes and outputs, to a frame memory 33 for storage, the MPEG2-compressed omnidirectional image data read out by the reproduction unit 31.

A clipping unit 34 clips display image data from the omnidirectional image data stored in the frame memory 33 in response to the view angle specified by a user through an operation of an operating unit 35 composed of a keyboard, a pointer device or an operation button etc, and displays, on a display unit 36 formed with a LCD (Liquid Crystal Display) or a CRT (Cathode Ray Tube), the image meeting the view angle specified by the user.

An operation of the reproducing apparatus is now described.

The reproduction unit 31 reads out and outputs, to the MPEG decoder 32, the MPEG2-compressed omnidirectional image data contained in the recording medium 16. The MPEG decoder 32 decodes and outputs the read MPEG2-compressed omnidirectional image data to the frame memory 32 for the storage.

Figure 7:
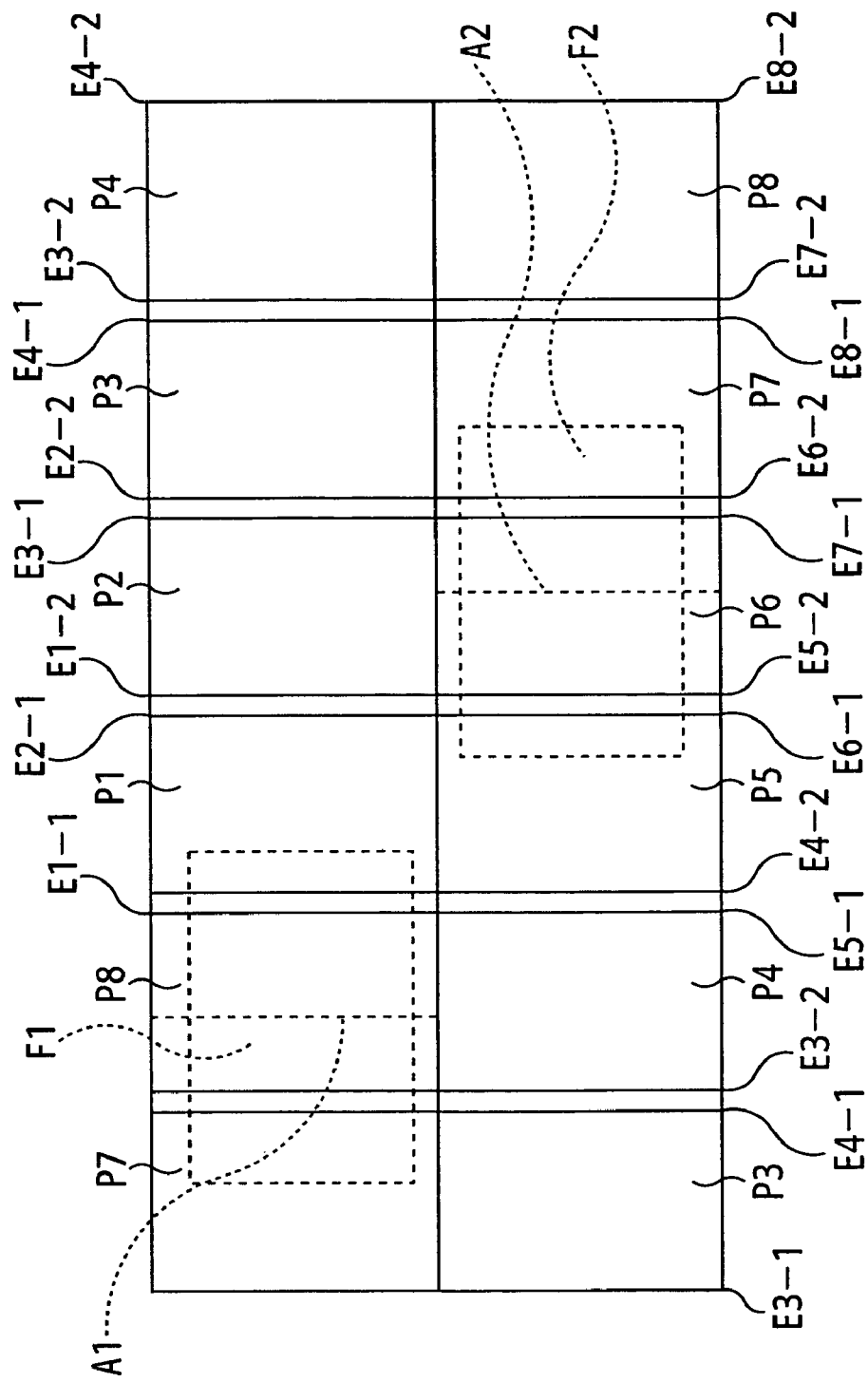
FIG. 7 is a view for illustrating the omnidirectional image data.

The clipping unit 34 reads out, from the omnidirectional image data stored in the frame memory 32, the display image meeting the view angle specified by the user through the operation of the operating unit 35, and displays the display image on the display unit 36. That is, when a view angle Al is specified through the operation of the operating unit 35 as shown in FIG. 7, for instance, the clipping unit 34 clips and displays, as the display image on the display unit 36, image data in the range shown by F1 within the omnidirectional image data stored in the frame memory 33. Also, when a view angle A2 is specified through the operation of the operating unit 35, the clipping unit 34 clips and displays, as the display image on the display unit 36, the image data in the range shown by F2 within the omnidirectional image data.

The use of the above reproducing apparatus makes it possible to perform the display of the image meeting a user's desired view angle (the angle of the visual point) through the recording medium containing the omnidirectional image.

Incidentally, while the above has described a case of the omnidirectional camera having the 8 video cameras 11, the omnidirectional camera may be also set to have more than the 8 video cameras. Further, the method of compressing the pictures on a frame basis is not limited to the MPEG2, and other compressing methods such as a Motion JPEG (Joint Photographic Experts Group), for instance, are also available.

Details of the configuration of the omnidirectional image data generation unit 13 are now described with reference to FIG. 8. The omnidirectional data generation unit 13 is to generate the omnidirectional image data from the 8 streams captured by the video cameras 11-1 to 11-8 as described the above, in which case, a generation of the omnidirectional image data is performed through the adjustment of a misalignment to ensure that the overlap portions are spliced together in a condition close to a complete coincidence of the overlap portions.

The misalignment created in the splicing may be mainly attributed to a parallax, a frame misalignment or a lack of run-on. The misalignment attributed to the parallax stated herein means a misalignment caused by the parallax between the video cameras 11 for reason that the omnidirectional image requires the splicing of the pictures captured with more than one video camera 11.

Further, the frame misalignment means a misalignment caused by an occurrence of pictures different in inter-frame time code of the pictures adjacent to the overlap portion. The pictures captured by the video cameras 11 are respectively arranged in time series as described the above, and basically ensure that the omnidirectional image is formed by splicing the identical time-code pictures together. However, the use of the more than one video camera 11 often results in a lack of frames in the captured pictures or a lack of data on a hardware obtained after a completion of digitization, in which case, the splicing of different time-code pictures sometimes occurs, leading to a creation of the misalignment in the overlap portion of the splicing pictures in that occasion.

Furthermore, the misalignment attributed to the lack of run-on means a misalignment caused by a failure in exact positional splicing of the overlap portions because of a problem of a hardware accuracy that meets no alignment of the stream data in a limited period of time, although being sufficient to attain an exact alignment if a careful splicing is performed.

The misalignment attributed to the parallax among the above causes is regarded as a difficult problem for reason that there is no way of solving, with an only exception of the adjustment of each of the video cameras 11. Thus, in considerations of the frame misalignment and the misalignment attributed to the lack of run-on described the above, an omnidirectional camera edit system (or an editing software) of the present invention compares pixel values between pixels in each overlap portion, and adjusts the pictures based on the result of comparison to generate the omnidirectional image data.

The configuration of the omnidirectional image data generation unit 13 available to adjust the pictures based on the result of comparison between the pixels in each overlap portion is now described with reference to FIG. 8.

A processing and splicing unit 61 generates temporary omnidirectional image data (temporary omnidirectional image data having the overlap portions that remain unadjusted) by splicing (pasting) the pictures together based on a prescribed amount of adjustment after the 90-degree rotation or the mirror inversion etc. of the image data sequentially supplied from the switching unit 12 after being captured by the video cameras 11-1 to 11-8, and causes the temporary omnidirectional image data to be stored in a frame memory 62. Further, the processing and splicing unit 61 repeats a processing of adjusting, while shifting pixel by pixel in a horizontal or vertical direction, for instance, splicing positions of the temporarily generated omnidirectional image data contained in the frame memory 62 based on the amount of adjustment calculated by an adjustment amount determining unit 66 for the adjustment of the picture position based on the temporary omnidirectional image data. The processing and splicing unit 61 outputs, as final omnidirectional image data to the MPEG encoder 14, the omnidirectional image (the picture-adjusted omnidirectional image) data contained in the frame memory 62 at the time when the misalignment width is judged to be within a prescribed range.

An overlap pixel detecting unit 63 detects the pixels in the overlap portions within the temporarily generated omnidirectional image contained in the frame memory 62 with the overlap portions unadjusted, and outputs a result of detection to a difference calculating unit 64. That is, when there is provided the generated omnidirectional image data as shown in FIG. 5, for instance, the pixels in the overlap portion in the range of E1-1 to E8-1, E2-1 to E1-2, E3-1 to E2-2, E4-1 to E3-2, E5-1 to E4-2, E6-1 to E5-2, E7-1 to E6-2, or E8-1 to E7-2 are detected.

The difference calculating unit 64 calculates absolute values of differences in pixel values, supplied from the overlap pixel detecting unit 63 with a counter not illustrated in the figure between prescribed pixels in all the overlap portions, and outputs a result of calculation to a comparing unit 65. That is, the difference calculating unit 64 calculates and outputs, to the comparing unit 65, the absolute values of the differences in pixel values of RGB signals, as the pixel values of the pixels in two pictures existing at the pixel position of each overlap portion. In the case of the overlap portion in the range of E2-1 to E1-2 shown in FIG. 5, for instance, the absolute values of the differences in pixel values of RGB components between the pixels in the range of the edges from E2-1 to E1-2 of the picture P1 and the pixels in the range of the edges from E2-1 to E1-2 of the corresponding picture P2 are calculated. Then, after the same processing as the above is repeatedly applied to all the overlap portions, all the calculated absolute values of the differences are summed up and are outputted to the comparing unit 65. Incidentally, while the following describes an embodiment adapted to a comparison in pixel value of one pixel at the identical pixel position of the overlap portion, it is also allowable to apply more than one pixel to the comparison, or of course, to calculate the absolute values of the differences in all the pixels at the identical pixel position of the overlap portion.

The comparing unit 65 compares a cumulative sum, supplied from the difference calculating unit 64, of the absolute values of the differences in all the overlap portions with a prescribed threshold th, and outputs a result of comparison to the adjustment amount determining unit 66. That is, the difference in pixel value between the pixels in the overlap portion is assumed to be zero if the two pictures contained in the overlap portion completely coincide at the edges thereof, so that the cumulative sum of the absolute values of the differences in all the overlap portions is also assumed to be smaller as the condition closer to the coincidence is obtained.

The adjustment amount determining unit 66 determines the amount of adjustment of the pictures for the processing and splicing unit 61 based on the result of comparison supplied from the comparing unit 65, and outputs the amount of adjustment to the processing and splicing unit 61. That is, when the result of comparison is not equal to or less than the prescribed threshold th, the adjustment amount determining unit 66 sets and outputs, to the processing and splicing unit 61, the amount of adjustment suited to sequentially change and splice the overlap portions (splice through the shifting), or when the result of comparison is equal to or less than the threshold, gives an instruction to output, as final omnidirectional image data to the MPEG encoder 14, the omnidirectional image data contained in the frame memory 62 at that period of time.

Figure 9:
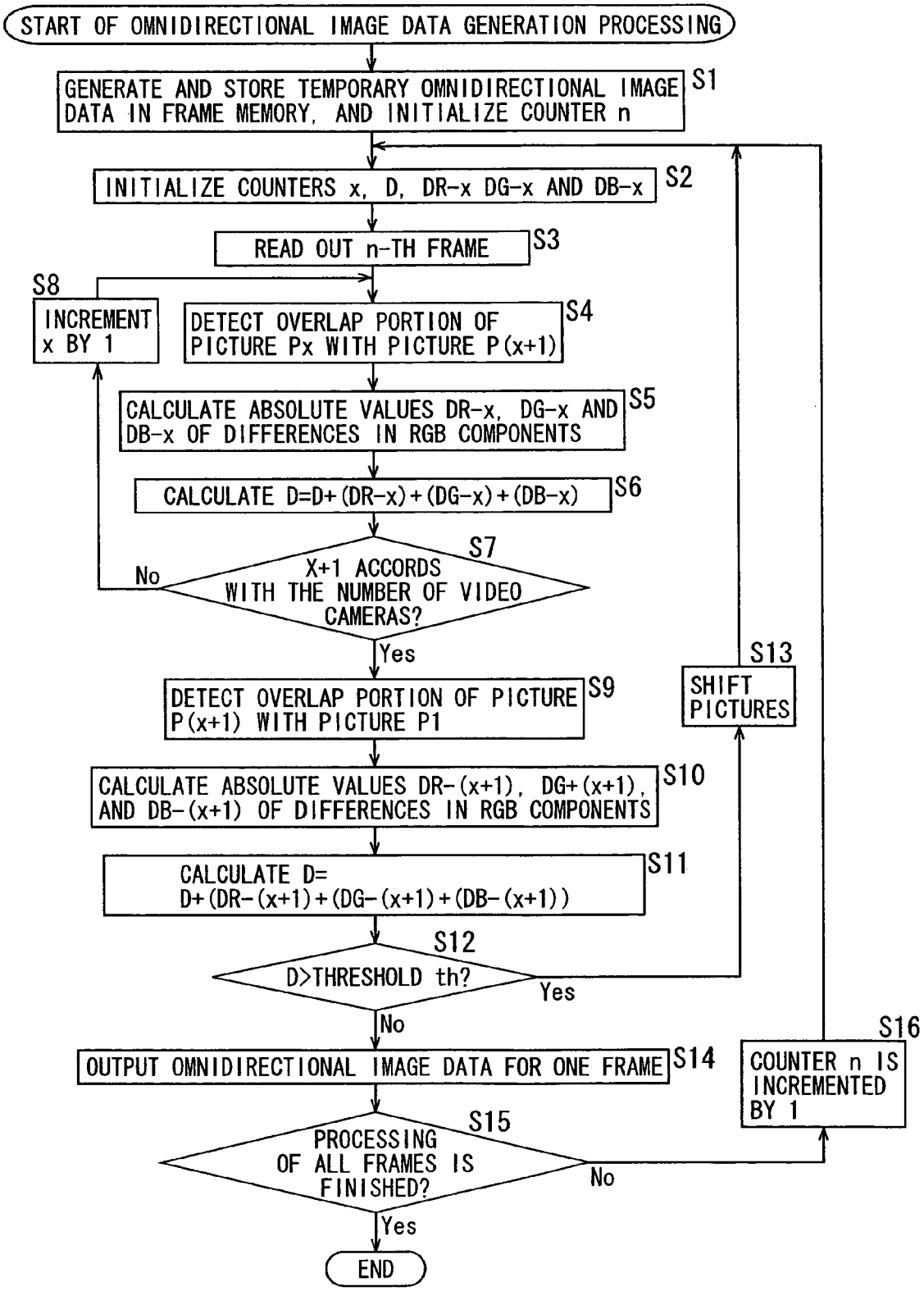
FIG. 9 is a flowchart for illustrating an omnidirectional image data generation processing with the omnidirectional image data generation unit shown in FIG. 8.

An omnidirectional image data generation processing is now described with reference to a flowchart of FIG. 9.

In Step S1, the processing and splicing unit 61 generates the temporary omnidirectional image data by, after subjecting, frame by frame, the 8 streams supplied from the switching unit 12 to the 90-degree rotation and further the mirror inversion, forming the overlap portions with the streams arranged at prescribed intervals, and causes the temporary omnidirectional image data to be stored in the frame memory 62, and a counter n that indicates the number of frames is initialized (n=1). That is, at this point of time in the Step S1, the coincidence of the pictures in the overlap portions remains unexamined.

In Step S2, a counter x ($1 \leq x \leq 7$) that indicates the number of overlap portions, a counter D that indicates the cumulative sum of the absolute values of the differences, and counters DR−x, DG−x, and DB−x that respectively indicate the absolute values of the differences in the RGB components between the pixels in each overlap portion are initialized (D=(DR−x)=(DG−x)=(DB−x)=0, wherein x=1).

In Step S3, the overlap pixel detecting unit 63 reads out the temporary omnidirectional image data of a corresponding n-th frame from the frame memory 62 with reference to the counter n, and in Step S4, detects the pixels in the overlap portion of a picture Px with a picture P(x+1), and outputs a result of detection to the difference calculating unit 64. That is, when the counter x is assumed to be 1 in the case of FIG. 4, for instance, the pixels corresponding to the overlap portion of the picture P1 with the picture P2 in the range of E2-1 to E1-2 are detected.

In Step S5, the difference calculating unit 64 calculates DR−x, DG−x, and DB−x specified as the absolute values of the differences between the pixels in the overlap portion of the picture Px with the picture P(x+1). That is, when the counter x is assumed to be 1, for instance, DR−1, DG−1, and DB−1 are calculated as the absolute values of the differences in the RGB components by calculating the absolute values of the differences in pixel values of the RGB components between the picture-P1 and the picture-P2 pixels corresponding to the pixels at the prescribed pixel position within the pixels corresponding to the overlap portion of the picture P1 with the picture P2 in the range of E2-1 to E1-2.

In Step S6, the difference calculating unit 64 adds the calculated absolute values DR−x, DG−x, and DB−x of the differences in the RGB components to the cumulative sum D of the absolute values of the differences (calcuates D=D+(DR−x)+(DG−x)+(DB−x), as the cumulative sum of the absolute values of the differences).

In Step S7, it is judged whether or not a value (=x+1) obtained by adding 1 to the overlap portion counter x accords with the number of video cameras (8, in this case), and when a judgment of no accord is given, the processing moves on to Step S8 where the counter x is incremented by 1, and returns to the Step S4.

That is, the cumulative sum of the absolute values of the differences between the pixels corresponding to the pixels at the prescribed pixel position in the overlap portions in the range of E2-1 to E1-2, E3-1 to E2-1, E4-1 to E3-2, E5-1 to E4-2, E6-1 to E5-2, E7-1 to E6-2, and E8-1 to E7-2 shown in FIG. 5 is supposed to be obtained depending on the value of the counter x.

In the Step S7, when it is judged that the value (=x+1) obtained by adding 1 to the overlap portion counter x accords with the number of video cameras (8, in this case), that is, a condition is given in which there is provided the calculated cumulative sum of the absolute values of the differences between the pixels corresponding to the pixels at the prescribed pixel position in the overlap portions in the range of E2-1 to E1-2, E3-1 to E2-2, E4-1 to E3-2, E5-1 to E4-2, E6-1 to E5-2, E7-1 to E6-2, and E8-1 to E7-2, the processing moves on to Step S9.

In the Step S9, the pixels in the overlap portion of the picture P(x+1) with the picture P1 are detected, and the result of detection is outputted to the difference calculating unit 64. That is, in the Step S9, the counter x is assumed to be 7, so that the pixels corresponding to the overlap portion of the picture P8 with the picture P1 in the range of E1-1 to E8-2 in FIG. 5 are supposed to be detected.

In Step S10, the difference calculating unit 64 calculates DR−(x+1), DG−(x+1), and DB−(x+1) specified as the absolute values of the differences between the pixels in the overlap portion of the picture P(x+1) (=P8) with the picture P1. That is, in the present case, the counter x is assumed to be 7, so that DR−8, DG−8, and DB−8 are calculated as the absolute values of the differences in the RGB components by calculating the absolute values of the differences in pixel values of the RGB components between the picture-P8 and picture-P1 pixels corresponding to the pixels at the prescribed pixel position within the pixels corresponding to the overlap portion of the picture P8 with the picture P1 in the range of E1-1 to E8-2.

In Step S11, the difference calculating unit 64 sums up the calculated absolute values DR−(x+1), DG−(x+1), and DB−(x+1) of the differences in the RGB components and the cumulative sum D of the absolute values of the differences (calculates D=D+(DR−(x+1))+(DG−(x+1))+(DB−(x+1), as the cumulative sum of the absolute values of the differences), and outputs the result of calculation to the comparing unit 65. That is, the cumulative sum D of the absolute values of the differences in pixel values between the pixels at the prescribed pixel position of the pictures in all the overlap portions for one frame contained in the omnidirectional image data is supposed to be calculated through the processing in the Step S11, so that the result of calculation is outputted to the comparing unit 65.

In Step S12, the comparing unit 65 compares the cumulative sum D supplied from the difference calculating unit 64 with the prescribed threshold th to judge whether or not the cumulative sum is larger than the threshold th, and when it is judged that the cumulative sum is larger than the threshold th, outputs a result of judgment to the adjustment amount determining unit 66, and the processing moves on to Step S13.

In the Step S13, the adjustment amount determining unit 66 supplies, to the processing and splicing unit 61, the amount of adjustment provided for the processing and splicing unit 61 to shift the pictures by a prescribed width, and after, in response to the supplied amount of adjustment, the processing and splicing unit 61 shifts, by the prescribed width (pixel by pixel in the horizontal or vertical direction, for instance), all the overlap portions of the n-th frame consisting of the omnidirectional image data contained in the frame memory 62, the processing returns to the Step S2.

In the Step S12, when it is judged that the cumulative sum D is not larger than the prescribed threshold th, in other words, the judgement of a small misalignment width is given for reason that the cumulative sum D is smaller than the prescribed threshold th, the processing and splicing unit 61 outputs, in Step S14, to the MPEG encoder 14, the omnidirectional image data of the n-th frame presently contained in the frame memory 62.

In Step S15, the processing and splicing unit 61 judges whether or not the generation of the picture-adjusted omnidirectional image data of all the frames is finished, and when it is judged that the generation of the picture-adjusted omnidirectional image data of all the frames is not finished, the processing moves on to Step S16.

In the Step S16, the frame counter n is incremented by 1, and the processing returns to the Step S2 to repeat the processing following the Step S2. On the other hand, in the Step S15, when it is judged that the generation of the picture-adjusted omnidirectional image data of all the frames is finished, the processing is completed.

That is, the processing in the Steps from S2 to S13 is repeated until the cumulative sum D smaller than the threshold this reached in Step S12, that is, the splicing of the overlap portions is provided exactly through the shifting of the position of the pictures in the n-th frame little by little. Then, when the small misalignment of the overlap portions, that is, the cumulative sum D smaller than the threshold th is reached, the omnidirectional image data in the n-th frame is outputted, leading to a transfer of the processing to the next frame of the omnidirectional image data. Then, the processing is completed at the time when the execution of the same processing as the above to all the frames is finished.

As described the above, the adjustment of the pictures is performed such that the absolute values of the differences in pixel values between the pixels in each overlap portion of the omnidirectional image data are minimized, permitting the omnidirectional image giving no sense of inconsistency to be displayed even if any overlap portion is contained in the display image meeting the view angle given a display instruction.

Figure 8:
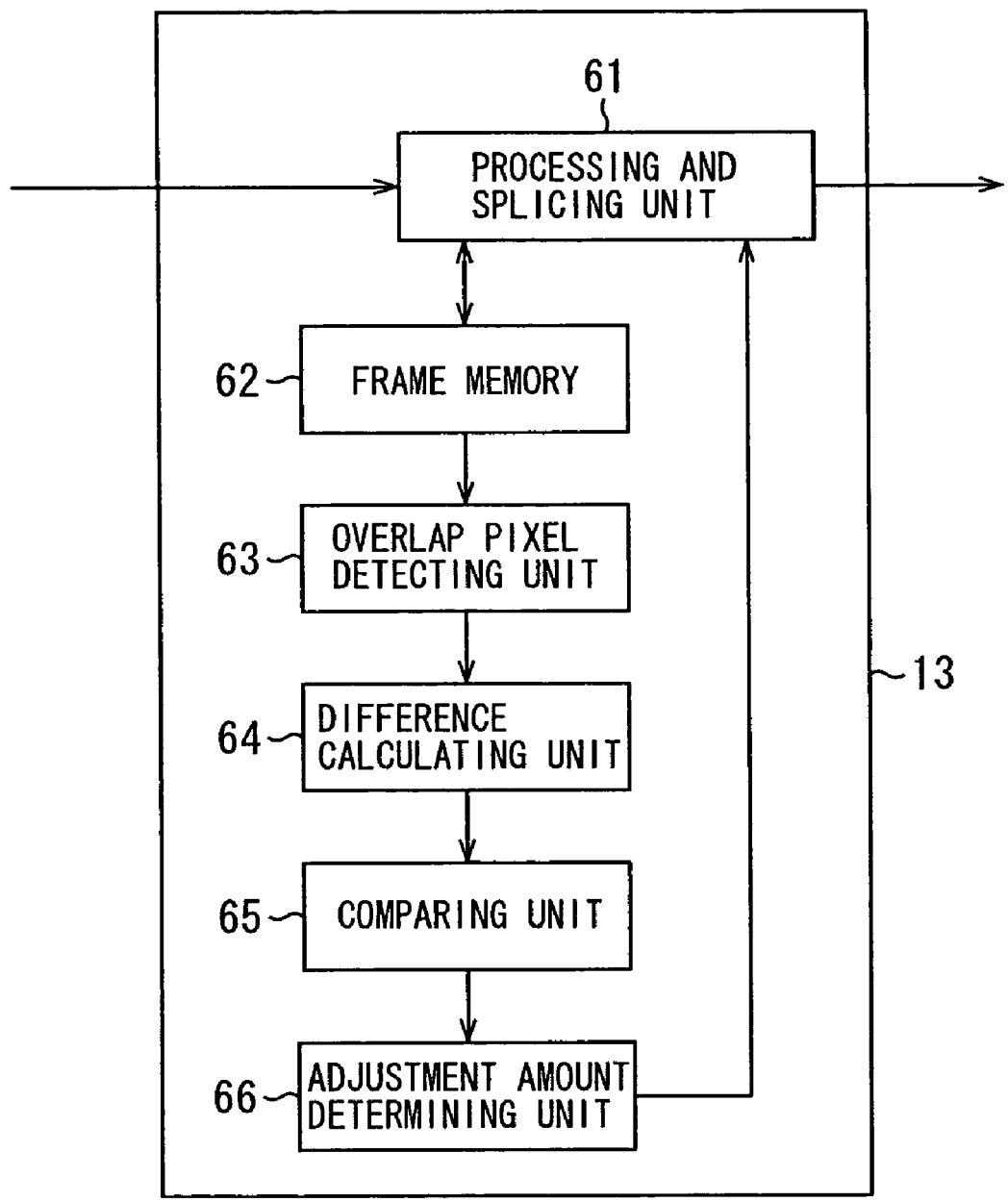
FIG. 8 is a block diagram showing a configuration of an omnidirectional image data generation unit shown in FIG. 1.

Incidentally, while the omnidirectional image data generation unit 13 of FIG. 8 has set the amount of adjustment based on the absolute values of the differences, it is allowable to generate more exactly picture-adjusted omnidirectional image data by taking a logarithm of the absolute values of the differences, for instance.

Figure 10:
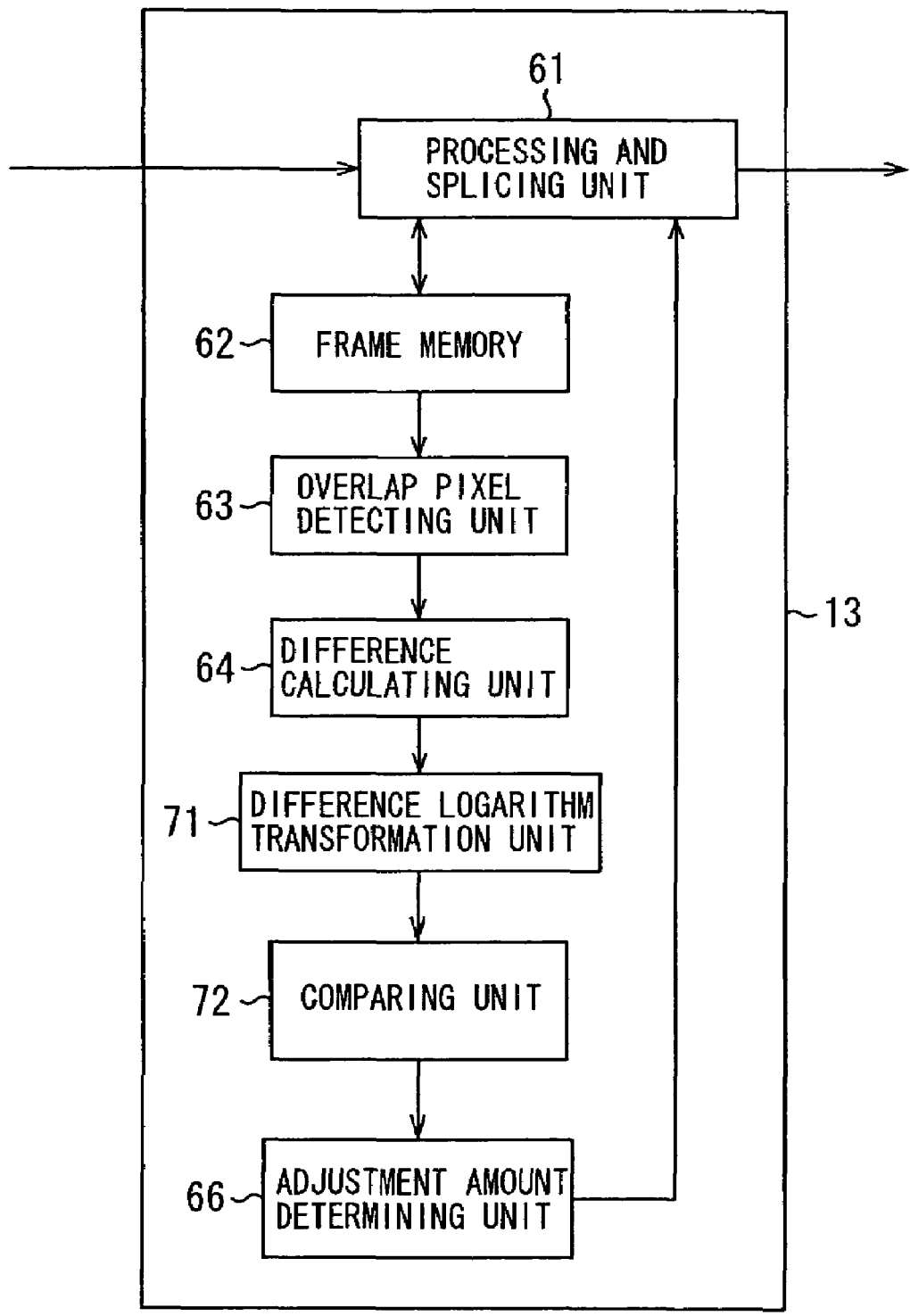
FIG. 10 is a block diagram showing a different configuration of the omnidirectional image data generation unit shown in FIG. 1.

FIG. 10 shows the omnidirectional image data generation unit 13 that is set to perform a logarithm transformation of the absolute values of the differences for the comparison with a prescribed threshold. Incidentally, in FIG. 10, units corresponding to those in FIG. 8 are given like reference numerals, and hence, a description thereof is omitted properly in the following. The omnidirectional image data generation unit 13 of FIG. 10 is different from the omnidirectional image data generation unit 13 of FIG. 8 in that the former has a difference logarithm transformation unit 71 and a comparing unit 72.

The logarithm transformation unit 71 calculates a logarithm LD by performing the logarithm transformation of the cumulative sum D, calculated by the difference calculating unit 64, of the absolute values of the differences, and outputs the logarithm LD to the comparing unit 72.

The comparing unit 72 is basically the same as the comparing unit 65 of FIG. 8 except that in place of the cumulative sum D of the absolute values of the differences, the logarithm LD is compared with a threshold th-L.

Figure 11:
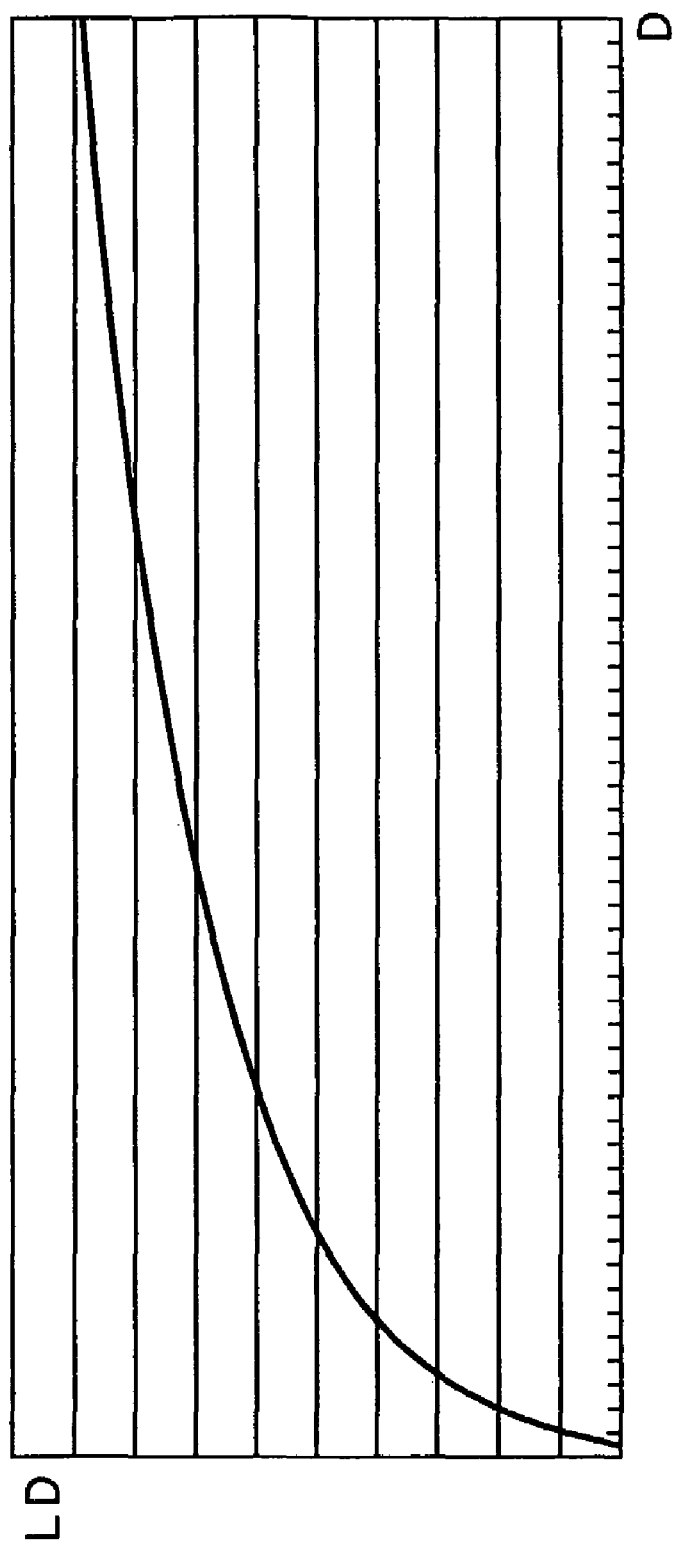
FIG. 11 is a view showing a change of a value when a logarithm is taken.

That is, as shown in FIG. 11, the use of the logarithm LD obtained by the logarithm transformation of the cumulative sum D of the absolute values of the differences causes an evaluation value (=the logarithm LD) for the misalignment of the overlap portion to change larger according as the misalignment width is smaller, or on the contrary, change smaller according as the misalignment width is larger, as compared with the cumulative sum D of the absolute values of the differences. For reason that the misalignment width of the overlap portion is basically assumed to be small, it is ensured that the logarithm LD is calculated as a large value (as compared with the case where no logarithm is taken) even in the occurrence of a fine misalignment, so that the small misalignment is evaluated sensitively, leading to a highly accurate adjustment of the pictures.

Figure 12:
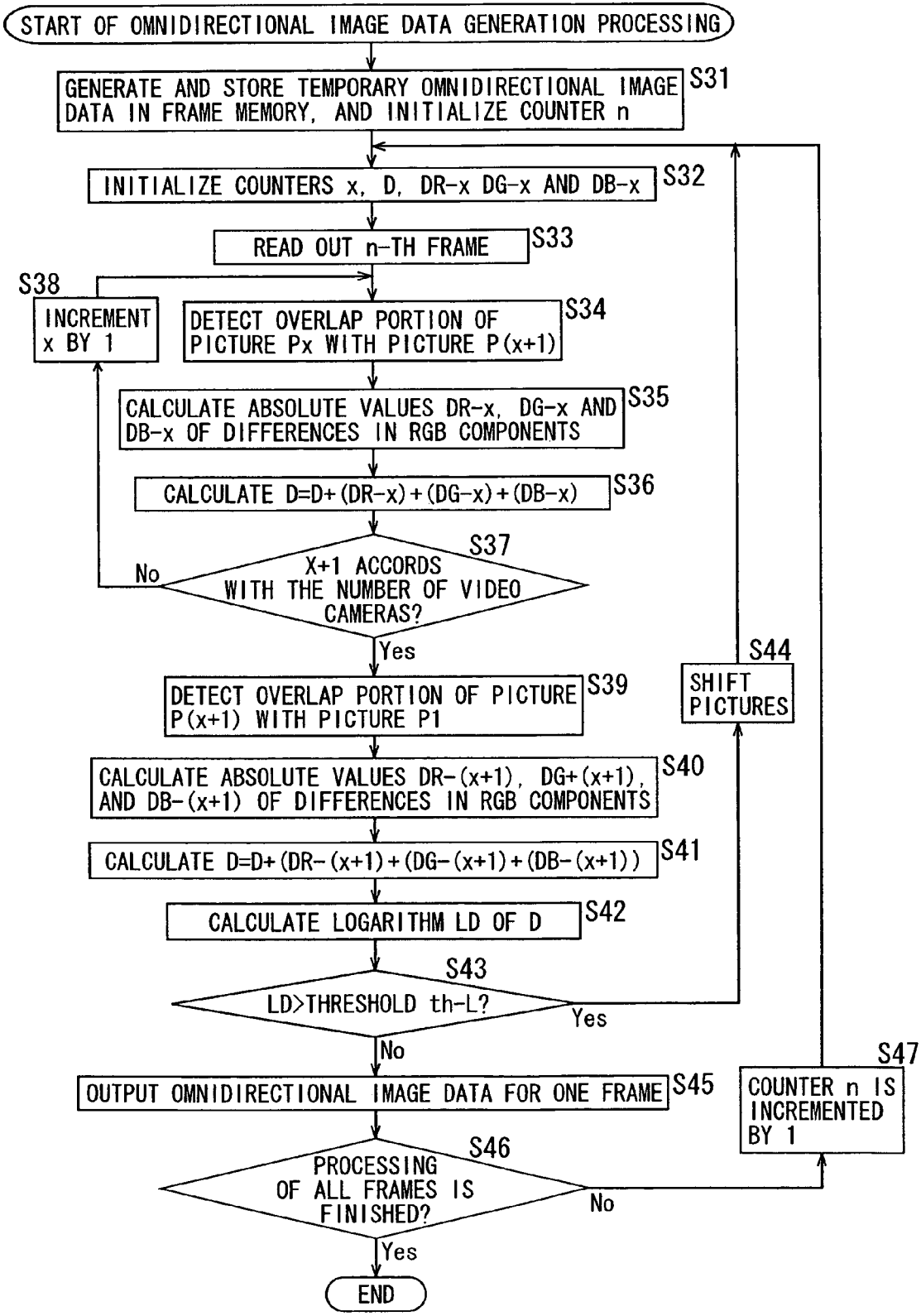
FIG. 12 is a flowchart for illustrating the omnidirectional image data generation processing with the omnidirectional image data generation unit shown in FIG. 10.

The omnidirectional image data generation processing with the omnidirectional image data generation unit 13 of FIG. 10 is now described with reference to a flowchart of FIG. 12. This processing is basically the same as the processing having been described with reference to the flowchart of FIG. 9 except for the use of the logarithm. Incidentally, the processing in Steps S31 to S41 and Steps S44 to S47 in FIG. 12 is the same as the processing in the Steps S1 to S15 having been described with reference to the flowchart of FIG. 9, and hence, the description thereof is omitted.

In Step S42, the difference logarithm transformation unit 71 calculates the logarithm LD by performing the logarithm transformation of the cumulative sum D, calculated by the difference calculating unit 64, of the absolute values of the differences in pixel values between the pixels at the prescribed pixel position of the pictures in all the overlap portions for one frame contained in the omnidirectional image data, and outputs the logarithm LD to the comparing unit 72.

In Step S43, the comparing unit 72 judges whether or not the logarithm LD is larger than the prescribed threshold th-L, and when it is judged that the logarithm LD is larger, that is, the judgement of the large misalignment of the overlap portion is given, the processing moves on to Step S44, or when it is judged that the logarithm LD is not larger, that is, the judgement of the small misalignment width of the overlap portion is given, the processing moves on to Step S45.

As described the above, the logarithm LD of the cumulative sum D is compared with the threshold th for the adjustment of the pictures using the result of comparison, permitting the highly accurate adjustment of the pictures.

In the above embodiment, the omnidirectional image data generation unit 13 of FIG. 8 or 10 performs the adjustment of the overlap portions, frame by frame, so that in consideration of the omnidirectional image shown in FIG. 4, for instance, the video camera 11-1 that finishes capturing the picture P1 may give rise to a noise depending on the timing, in which case, the noise appears in the overlap portion in the range of E1-2 to E2-1 of the picture P1, leading to the failure in the accurate adjustment of all the overlap portions for one frame under the influence of the noise originating in one video camera 11-1, provided that the capturing of the pictures containing no noise is attained in the video cameras 11-2 to 11-8 that finish the capturing the pictures P2 to P8.

Thus, in the case of the omnidirectional image data as shown in FIG. 4, for instance, it is also allowable to evaluate the misalignment width of the overlap portion by calculating medians of the difference absolute values calculated for each overlap portion for the comparison of the medians with a prescribed threshold th-M.

Figure 13:
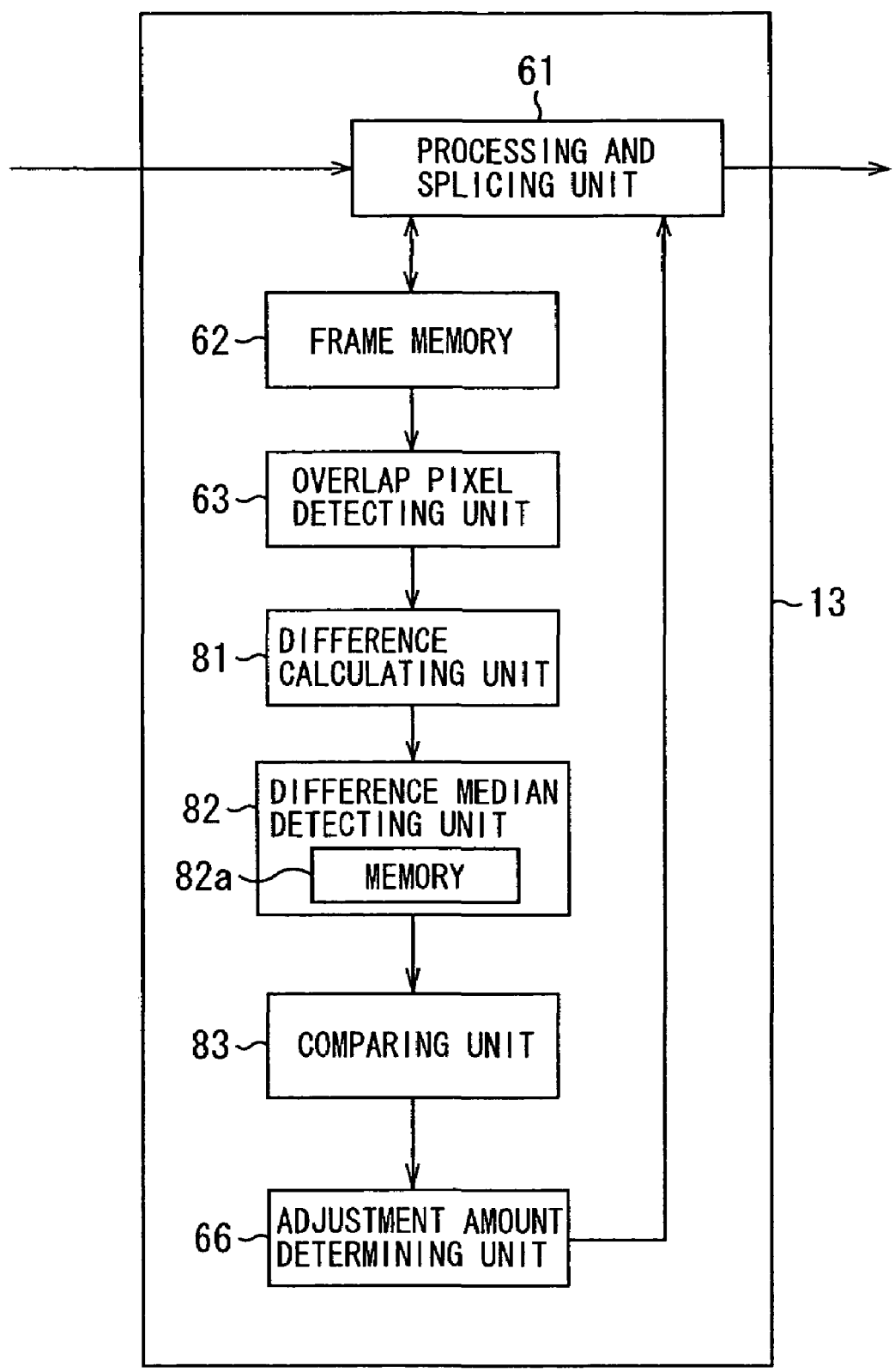
FIG. 13 is a block diagram showing a further different configuration of the omnidirectional image data generation unit shown in FIG. 1.

FIG. 13 shows the configuration of the omnidirectional image data generation unit 13 that is set to calculate the medians of the absolute values of the differences in pixel values between the pixels at the prescribed pixel position in all the overlap portions in the omnidirectional image data for the comparison with the predetermined threshold th-M. Incidentally, in FIG. 13, units corresponding to those in the case of FIG. 8 are given like reference numerals, and hence, the description thereof is omitted properly in the following. The omnidirectional image data generation unit 13 of FIG. 13 is different from the omnidirectional image data generation unit 13 of FIG. 8 in that the former has a difference calculating unit 81, a difference median detecting unit 82 and a comparing unit 83.

The difference calculating unit 81 calculates the differences in pixel values of the RGB components between the pixels at the prescribed pixel position in each overlap portion, like the difference calculating unit 64 of FIG. 8, in which case, however, after the calculation, the differences are outputted to the difference median detecting unit 82 without being cumulatively summed up.

The difference median detecting unit 82 stores, in a memory 82*a* at any time, the absolute values, supplied from the difference calculating unit 81, of the differences between the pixels at the prescribed pixel position in each overlap portion, and after the completion of the storage of the absolute values of the differences in the RGB components between the pixels at the prescribed pixel position of all the overlap portions, detects difference medians MDR, MDG, and MDB through a rearrangement of the above absolute values in ascending or descending order, further, generates MD by summing up these difference medians and outputs the MD to the comparing unit 83.

That is, when the absolute values of the differences in pixel values of the R component with reference to the respective overlap portions in the range of E1-1 to E8-2, E2-1 to E1-2, E3-1 to E2-2, E4-1 to E3-2, E5-1 to E4-2, E6-1 to E5-2, and E7-1 to E6-2 are respectively assumed to be 11, 12, 15, 24, 13, 14, and 12, the rearrangement of these absolute values in the ascending order causes the above absolute values to be placed in the order of the overlap portions in the range of E1-1 and E8-2, E2-1 to E1-2, E7-1 to E6-2, E5-1 to E4-2, E6-1 to E5-2, E3-1 to E2-2, and 4-1 to E3-2. Further, the absolute value of 13 is supposed to be detected as the median of the absolute values of the differences in the overlap portion in the range of E5-1 to E4-2. In the present case, for instance, the absolute value of the difference in the overlap portion in the range of 4-1 to 3-2 is assumed to be 24 that is a value larger than the other values and may be a value caused by the noise, in which case, however, the median is selected, resulting in no selection of any value that may contain the noise as described the above.

The comparing unit 83 compares the difference median DM supplied from the difference median detecting unit 82 with the prescribed threshold th-M, and outputs the result of comparison to the adjustment amount determining unit 66.

Figure 14:
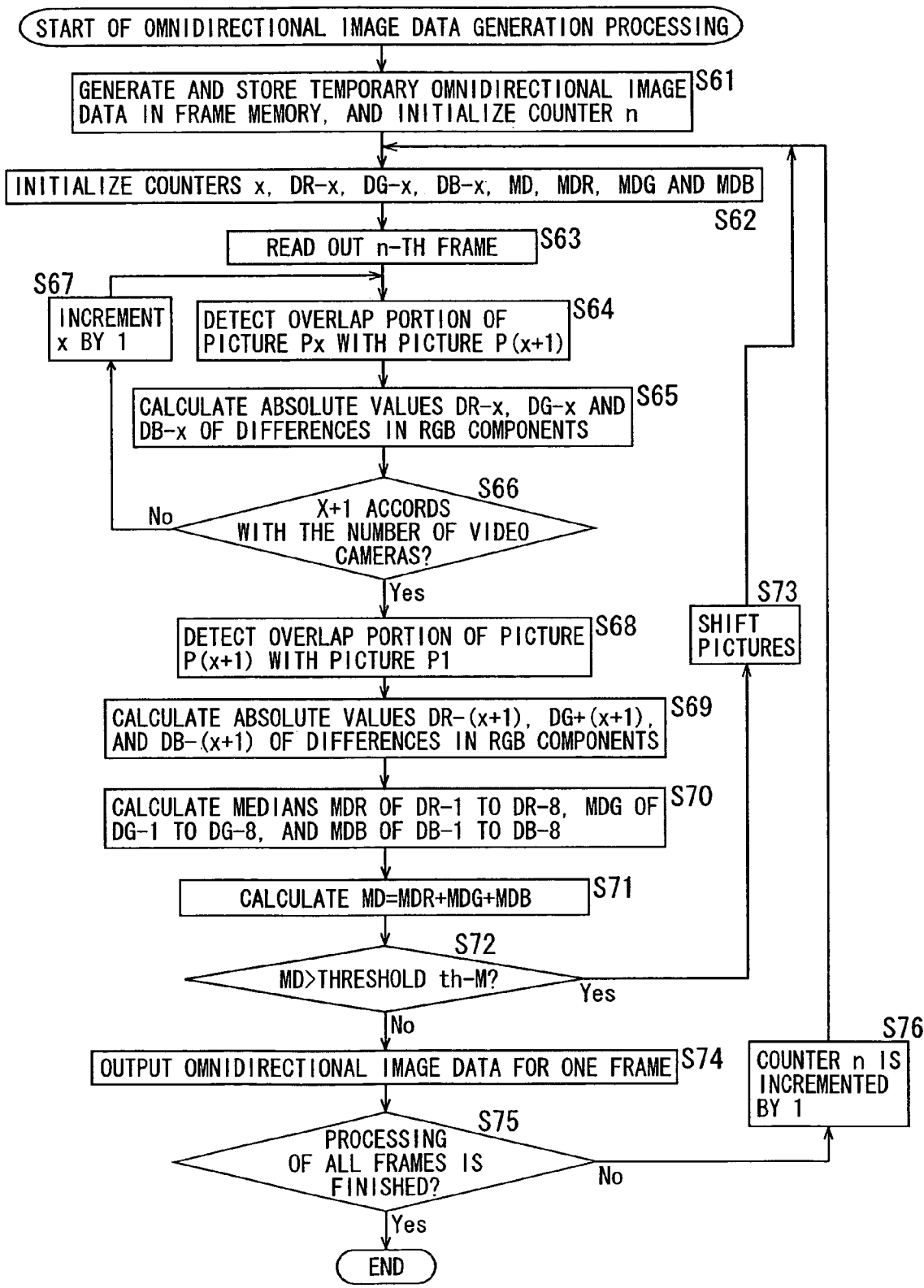
FIG. 14 is a flowchart for illustrating the omnidirectional image data generation processing with the omnidirectional image data generation unit shown in FIG. 13.

The omnidirectional image data generation processing with the omnidirectional image data generation unit 13 of FIG. 13 is now described with reference to a flowchart of FIG. 14. Incidentally, the processing in Steps S61, S63, S64, S66 to S69, and S73 to S76 in the flowchart of FIG. 14 is the same as the processing in the Steps S1, S3, S4, S7 to S9, and S13 to S15 having been described with reference to the flowchart of FIG. 9, and hence, the description thereof is omitted.

In Step S62, the counter x (1≦x≦7) that indicates the number of overlap portions, a counter MD that indicates the median of the absolute values of the differences, and counters DR−x, DG−x and DB−x that respectively indicate the absolute values of the differences in the RGB components between the pixels in each overlap portion are initialized (D=(DR−x)=(DG−x)=(DB−x)=0, wherein x=1).

In Step S65, the difference calculating unit 81 calculates and outputs, to the difference median detecting unit 82 for the storage in the memory 82*a*, DR−x, DG−x, and DB−x specified as the absolute values of the differences between the pixels in the overlap portion of the picture Px with the picture P(x+1).

In Step S70, the difference median detecting unit 82 detects the median MDR through the rearrangement of the absolute values DR−1 to DR−8, contained in the memory 82*a*, of the differences in pixel values of the R component in the ascending or descending order, also detects the medians MDG and MDB of the absolute values of the differences in pixel values of the G and B components, likewise, and in Step S71, generates the median MD by summing up these medians MDR, MDG, and MDB and outputs the median MD to the comparing unit 83.

In Step S72, the comparing unit 83 judges whether or not the median MD is larger than the prescribed threshold th-M, and when it is judged that the median is larger, the processing moves on to Step S73, or when it is judged that the median is not larger, the processing moves on to Step S74.

As described the above, the adjustment of the pictures is performed by comparing the medians of each overlap portion within the omnidirectional image data with the threshold th-M, so that even in the case of the occurrence of the noise etc. in any of the video cameras 11-1 to 11-8 as shown in FIG. 4, for instance, the judgement of the presence or not of the misalignment of the overlap portion may be given exactly, permitting the omnidirectional image data giving no sense of inconsistency to be generated even if being specified by the arbitrary view angle.

In the above embodiments, the frame misalignment and the misalignment attributed to the lack of run-on occur simultaneously, and there is no clear distinction as to which of the frame misalignment and the misalignment attributed to the lack of run-on is the cause of the misalignment. Thus, it is also allowable to calculate the medians over a whole frame range for a clear distinction as to which of the frame misalignment and the misalignment attributed to the lack of run-on is the cause of the misalignment.

Figure 15:
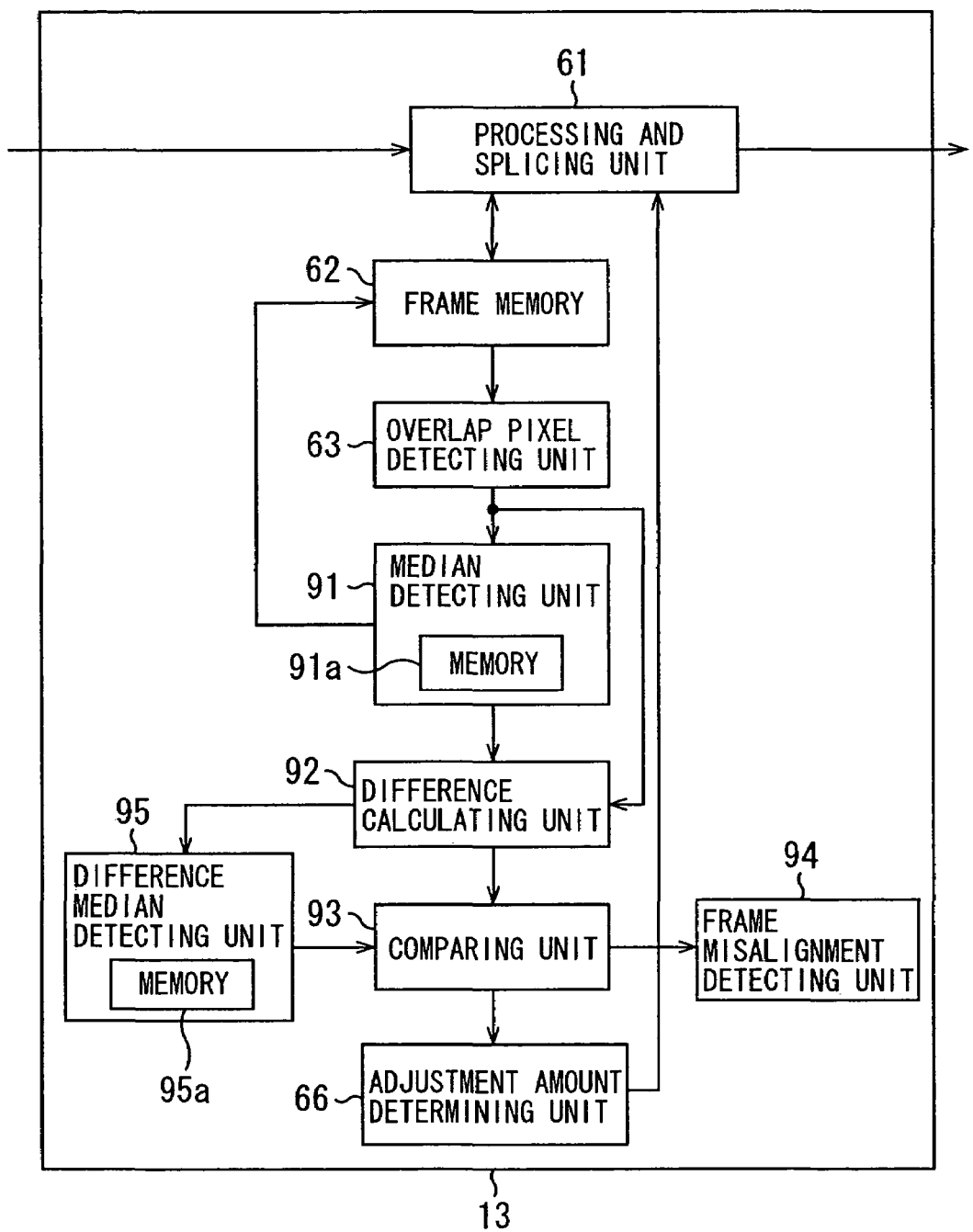
FIG. 15 is a block diagram showing a still further different configuration of the omnidirectional image data generation unit shown in FIG. 1.

FIG. 15 shows the configuration of the omnidirectional image data generation unit 13 that is set to calculate the medians over the whole frame range by acquiring the pixel values at the prescribed pixel position for each overlap portion of the omnidirectional image data for the comparison of the sum of the differences between the overlap portions with a prescribed threshold th-MA, leading to a correction of the misalignment of the pictures based on the result of comparison. Incidentally, in FIG. 15, units corresponding to those in the case of FIG. 8 are given like reference numerals, and hence, the description thereof is omitted properly in the following. The omnidirectional image data generation unit 13 of FIG. 15 is different from the omnidirectional image data generation unit 13 of FIG. 8 in that the former has a median detecting unit 91, a difference calculating unit 92, a comparing unit 93 and a frame misalignment detecting unit 94.

The median detecting unit 91 stores, in a memory 91*a*, the pixel values of the RGB components at the prescribed pixel position in each overlap portion over the whole frame range, and detects medians MYRxt, MYGxt, MYBxt, MYRxb, MYGxb, and MYBxb through the rearrangement of the pixel values of the RGB components in the ascending or descending order, frame by frame, for each corresponding pixel position.

Incidentally, in the following description, the overlap portion of the picture Px with the picture P(x+1) shown in FIG. 4 is set to give the medians of the RGB components of the picture Px in terms of MYRxb, MYGxb, and MYBxb, and the medians of the RGB components of the picture P(x+1) in terms of MYR(x+1)t, MYG(x+1)t, and MYB(x+1)t. Provided that the overlap portion of the picture P(x+1) with the picture P1 is set to give the RGB components of the picture P1 in terms of MYR1t, MYG1t, and MYB1t, and the RGB components of the picture P8 in terms of MYR(x+1)b, MYG(x+1)b, and MYB(x+1)b.

The difference calculating unit 92 calculates the difference between the medians, supplied from the median detecting unit 91, of the overlap portions of the adjacent pictures for each pixel position, generates a cumulative sum MDA by summing up these values and outputs the cumulative sum MDA to the comparing unit 93. Further, the difference calculating unit 92 calculates the differences in pixel value of the RGB components between the pixels at the prescribed pixel position of each overlap portion, like the difference calculating unit 81 of FIG. 13, in which case, however, after the calculation, the differences are outputted to the difference median detecting unit 95 without being cumulatively summed up.

When the pixel values of the R component at the prescribed pixel position in the overlap portion in the range of E1-1 to E8-2 are assumed to be 11, 12, 15, 24, 13, 14, and 12 in the range of the first to the seventh frame, the calculation of the median through the rearrangement of these values in the ascending order results in a detection of the pixel value of 13 (the fifth frame). This detected value is the least likely to be a value specifying the noise in the pixel taken into account. The noise added to the pictures that form the basis shows an unbalanced value on a distribution, and is thus commonly distributed in a maximum or minimum value range. Further, this detected value is the most likely to be a value specifying the background within the captured pictures. If a certain moving object is assumed to be across the overlap portion, a time required for the moving object to occupy the pixel taken into account would be small on the whole of the frames, resulting in a large deviation from the median. Thus, the calculation of the median is supposed to be effective in extracting only the background through a removal of the noise in the overlap portion, so that the execution of the splicing based on this median ensures that the splicing is attained based on the still background, permitting a suppression of the misalignment attributed to the lack of run-on. The misalignment that still exists after the completion of the splicing of all the frames with a calculated parameter is most likely to be the mere frame misalignment. Thus, the distinction between the misalignment attributed to the lack of run-on and the frame misalignment may be made.

The comparing unit 93 compares the sum MDA of the differences between the medians supplied from the difference calculating unit 92 with the prescribed threshold th-MA, and outputs the result of comparison to the adjustment amount determining unit 66 to adjust the picture position.

The difference median detecting unit 95 and the memory 95a are the same as the difference median detecting unit 82 and the memory 82a of FIG. 13, where the absolute values, supplied from the difference calculating unit 92, of the differences between the pixels at the prescribed pixel position in each overlap portion are stored at any time in the memory 95a, and after the completion of the storage of the absolute values of the differences in the RGB components between the pixels at the prescribed pixel position in all the overlap portions, the difference medians MDR, MDG, and MDB are detected through the rearrangement of the absolute values, frame by frame, in the ascending or descending order, and the MD is generated by summing up these medians and is outputted to the comparing unit 93. In this place, the comparing unit 93 functions like the comparing unit 83 of FIG. 13, where the difference median DM supplied from the difference median detecting unit 82 is compared with the prescribed threshold th-M, and the result of comparison is outputted to the frame misalignment detecting unit 94.

When it is appreciated from the result of comparison supplied from the comparing unit 93 that the frame misalignment occurs, the frame misalignment detecting unit 94 displays, on the non-illustrated display unit (such as the LCD that displays an operation display etc.), information representing a number assigned to the frame in which the misalignment occurs.

Figure 16:
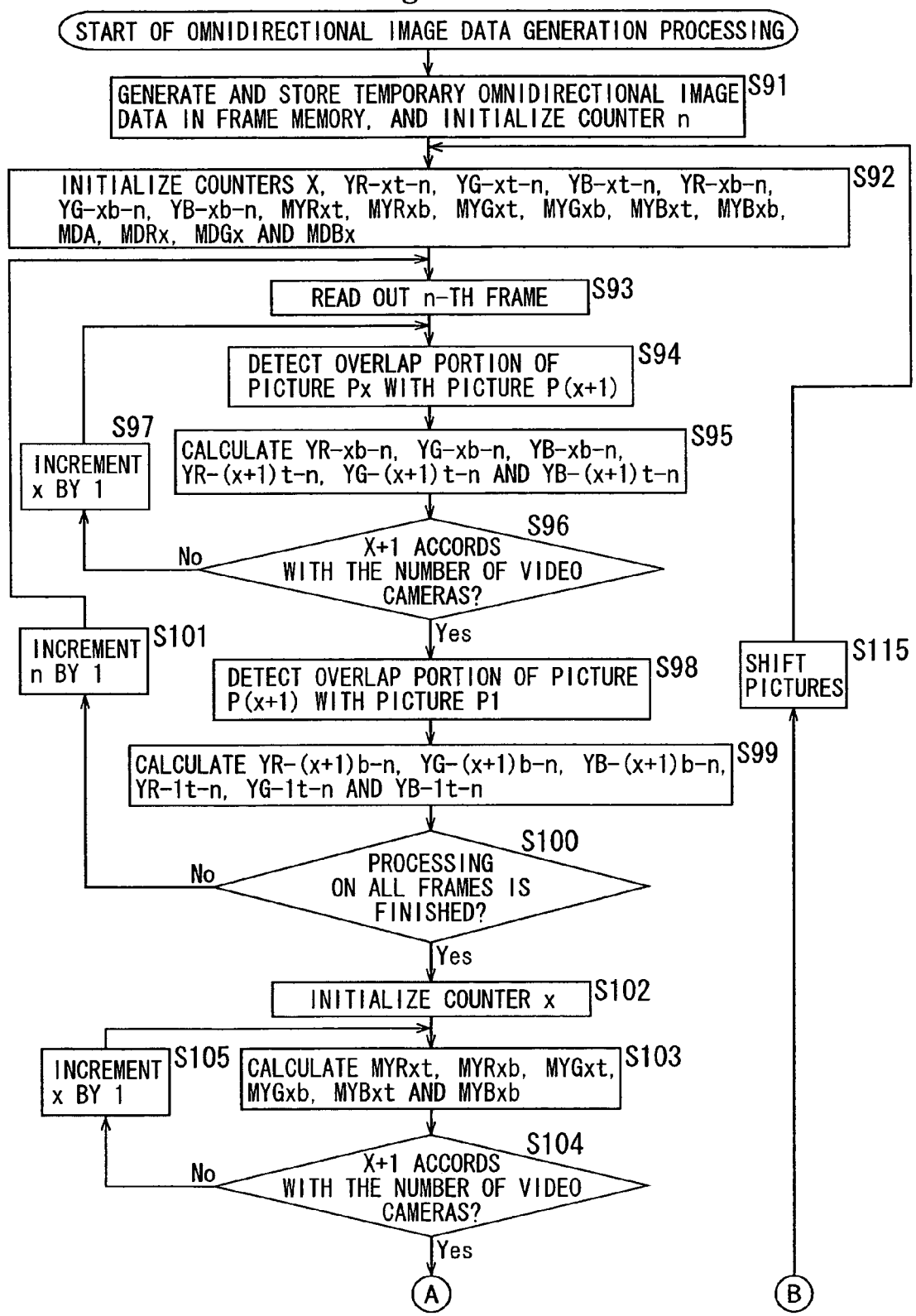
FIG. 16 is a flowchart for illustrating the omnidirectional image data generation processing with the omnidirectional image data generation unit shown in FIG. 15.
Figure 17:
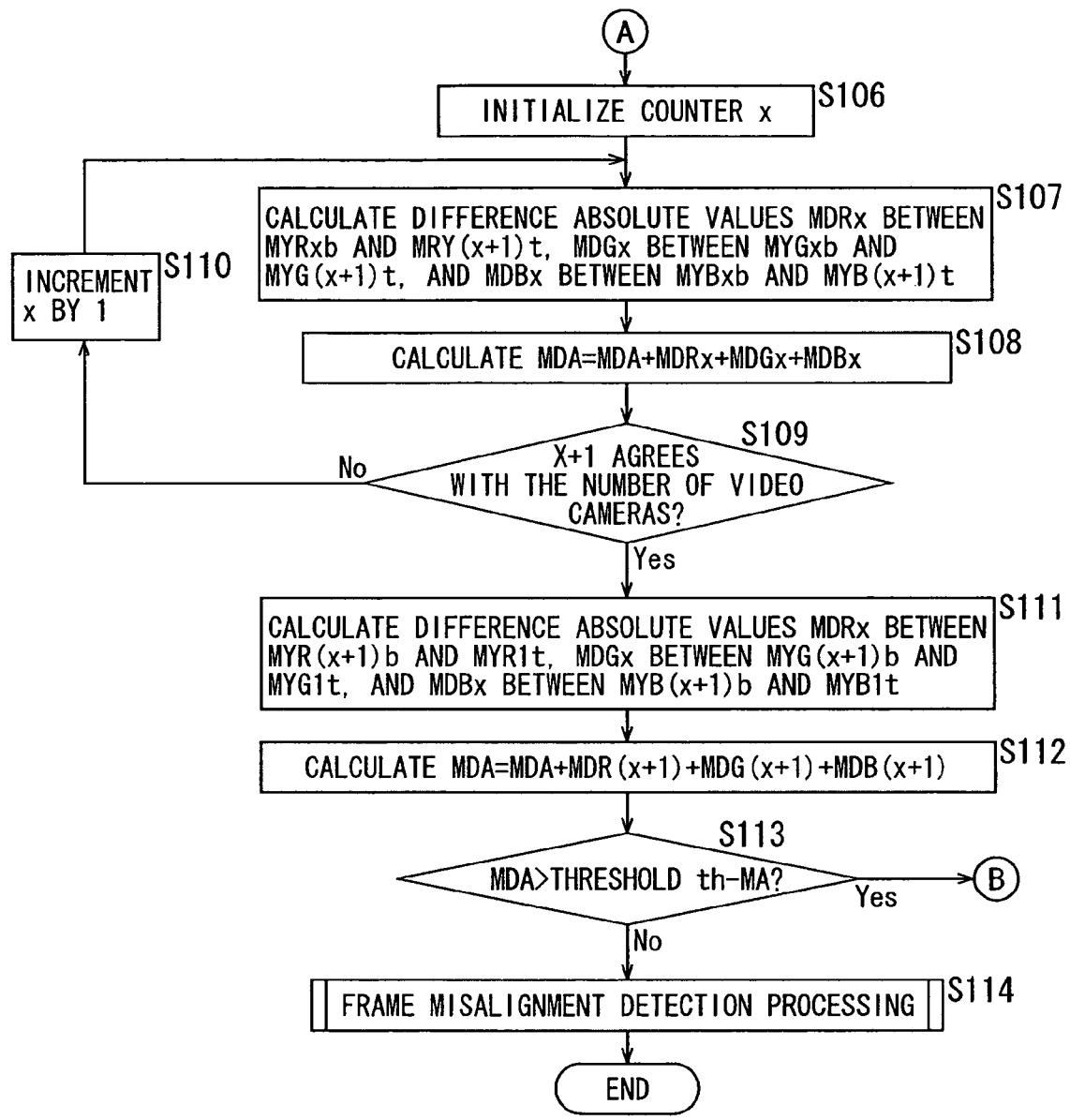
FIG. 17 is a flowchart for illustrating the omnidirectional image data generation processing with the omnidirectional image data generation unit shown in FIG. 15.

The omnidirectional image data generation processing with the omnidirectional image data generation unit 13 is now described with reference to flowcharts of FIGS. 16 and 17. Incidentally, the processing in Steps S91, S93, S94, S96, S97, S100, S101, S104, S105, S109, S110 and S115 is the same as the processing in the Steps S61, S63, S64, S66, S67, S75, S76, S66, S67, S66, S67 and S73 in the flowchart of FIG. 14, and hence, the description thereof is omitted.

In Step S92, the counter x and counters YR-xt-n, YG-xt-n, YB-xt-n, YR-xb-n, YG-xb-n, YB-xb-n, MYRxt, MYGxt, MYBxt, MYRxb, MYGxb, MYBxb, MDA, MDRx, MDGX, and MDBx that respectively store the pixels in the overlap portions are initialized. Incidentally, YR-xt-n, YG-xt-n, and YB-xt-n represent the RGB components in the overlap portion of the picture Px with the picture P(x−1) in the frame n, YR-xb-n, YG-xb-n, and YB-xb-n represent the RGB components in the overlap portion of the picture Px with the picture P(X+1) in the frame n, MYRxt, MYGxt, and MYBxt represent the medians of the RGB components in the overlap portion of the picture Px with the picture P(x−1) in the frame n, MYRxb, MYGxb, and MYBxb represent the medians of the RGB components in the overlap portion of the picture Px with the picture P(x−1) in the frame n, MDRx, MDGX, and MDBX represent the absolute values of the differences for each RGB component between the medians of the overlap portion of the picture Px with the picture P(X+1), and MDA represents the difference cumulative sum of the differences MDRx, MDGX, and MDBX.

In Step S95, the median detecting unit 91 reads out and stores, in the memory 91a, the RGB components YR-xb-n, YG-xb-n, and YB-xb-n of the picture Px and the RGB components YR-(x+1)t-n, YG-(x+1)t-n, and YB-(x+1)t-n of the picture P(x+1) in the overlap portion of the picture Px with the picture P(x+1) in the frame n of the detected overlap portion.

In the case of FIG. 4, for instance, the pixel values of the overlap portions of the picture P1 with the picture P2, the picture P2 with the picture P3, the picture P3 with the picture P4, the picture P4 with the picture P5, the picture P5 with the picture P6, the picture P6 with the picture P7, and the picture P7 with the picture P8 are supposed to be stored by repeating the processing in the Steps from S94 to S97.

Further, in Step S99, the median detecting unit 91 reads out and stores, in the memory 91a, the RGB components YR-(x+1)b-n, YG-(x+1)b-n, and YB-(x+1)b-n of the picture P(x+1) and the RGB components YR-1t-n, YG-1t-n, and YB-1t-n of the picture P1 in the overlap portion of the picture P(x+1) with the picture P1 in the frame n of the detected overlap portion.

The pixel values of the pictures in the overlap portions of all the frames are supposed to be stored in the memory 91a by repeating the processing in the Steps from S93 to S101.

In Step S102, the counter x is initialized. In Step S103, the median detecting unit 91 calculates and outputs, to the difference calculating unit 92, the medians MYRxt, MYGxt, MYBxt, MYRxb, MYGxb, and MYBxb, contained in all the frames, of the RGB components of the overlap portions of the picture Px with the picture P(x−1) and with the picture P(x+1). Then, all the medians MYRxt, MYGxt, MYBxt, MYRxb, MYGxb, and MYBxb of the pictures Px are supposed to be calculated by repeating the processing in the Steps S103 to S105.

In Step S106, the counter x is initialized.

In Step S107, the difference calculating unit 92 calculates absolute values MDRx of the difference between the medians MYRxb and MYR(x+1)t, MDGx of the difference between the medians MYGxb and MYG(x+1)t, and MDBX of the difference between the medians MYBxb and MYB(x+1)t. That is, the absolute values of the differences between the medians in the RGB components in the overlap portion of the picture Px with the picture P(x+1) are supposed to be calculated.

In Step S108, the difference calculating unit 92 sums up the difference cumulative sum MDA and the difference absolute values MDRx, MDGx, and MDBX.

In the case of FIG. 4, the cumulative sum of the medians in the RGB components in the overlap portions in the range of the pictures from P1 to P8 is calculated through the processing in Steps S109 and S110.

In Step S111, the difference calculating unit 92 calculates absolute values MDR(x+1) of the difference between the medians MYR(X+1)b and MYR1t, MDG(x+1) of the difference between the medians MYG(x+1)b and MYR1t, and MDB(x+1) of the difference between the medians MYB(x+1)b and MYB1t. That is, the differences between the medians in the RGB components in the overlap portion of the picture P(x+1) with the picture P1 are supposed to be calculated.

In Step S112, the difference calculating unit 92 sums up the difference cumulative sum MDA and the difference absolute values MDR(x+1), MDG(x+1), and MDB(x+1).

That is, the difference cumulative sum MDA of the medians in the RGB components in the overlap portions of all the pictures is supposed to be calculated through the processing in the Steps S107 to S112.

In Step S113, the comparing unit 93 compares the difference cumulative sum MDA with the prescribed threshold th-MA to judge whether or not the difference cumulative sum MDA is larger than the threshold th-MA, and when it is judged that the difference cumulative sum MDA is larger than the threshold th-MA, the processing returns to Step S115, or when it is judged that the difference cumulative sum MDA is not larger than the threshold th-MA, that is, smaller than the threshold th-MA, the processing is completed after the execution of a frame misalignment detection processing in Step S114. That is, the processing in the Steps from S92 to S113 is supposed to be repeated until the difference cumulative sum MDA smaller than the prescribed threshold th-MA is reached.

The frame misalignment detection processing is now described with reference to a flowchart of FIG. 18.

Figure 18:
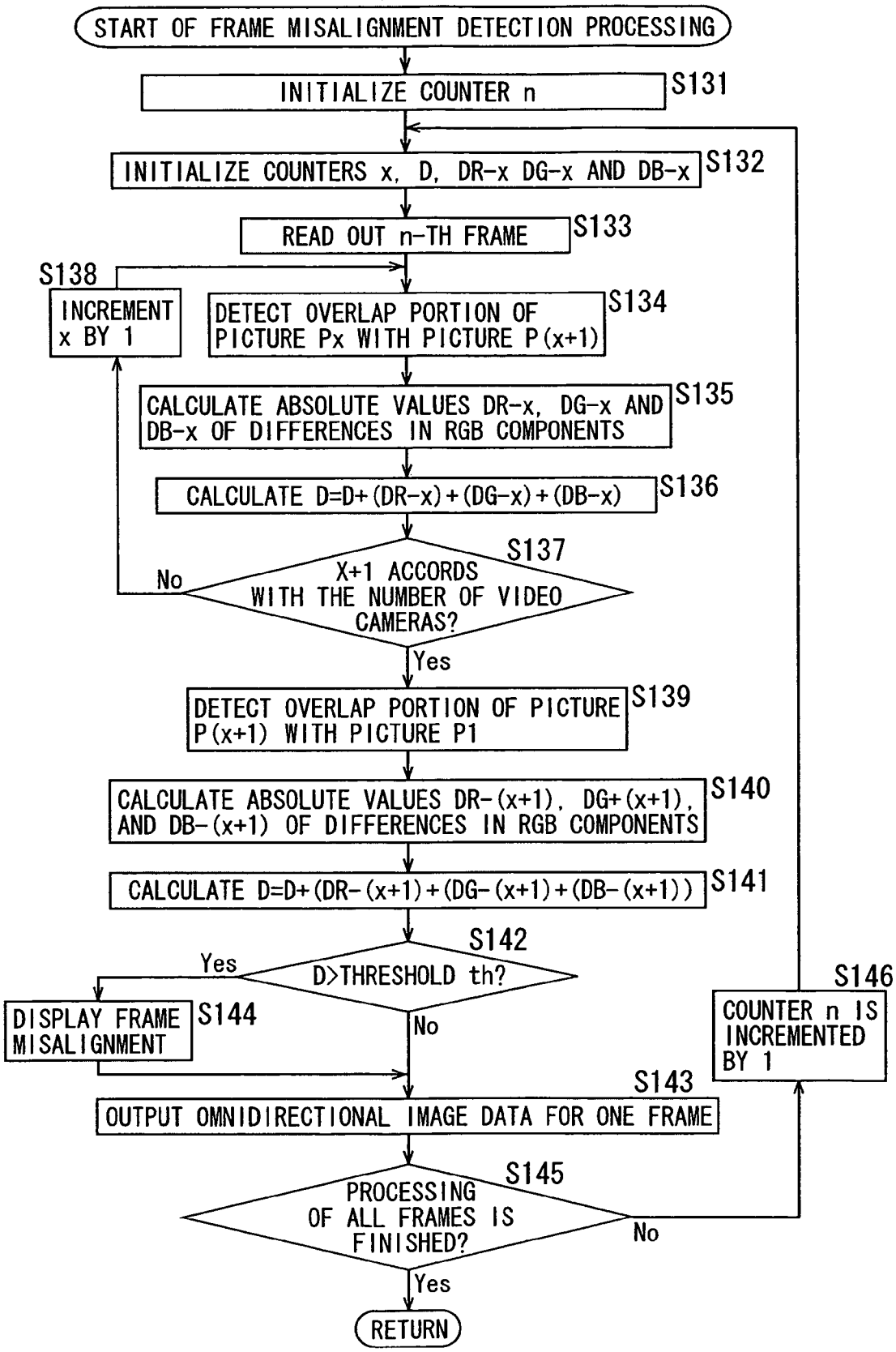
FIG. 18 is a flowchart for illustrating a frame misalignment detection processing with the omnidirectional image data generation unit shown in FIG. 15.

Incidentally, the processing in Steps S131 to 142, S143, S145, and S146 in the flowchart of FIG. 18 is the same as the processing in the Steps S1 to S12, and S14 to S16 having been described with reference to the flowchart of FIG. 9, and hence, the description thereof is omitted.

When it is judged in the Step S142 that the cumulative sum D is larger than the threshold th, the frame misalignment detecting unit 94 judges, in Step S144, that the frame misalignment occurs in the frame n, and then outputs information of the occurrence of the misalignment in the frame n by means of displaying etc. on the non-illustrated display, for instance. Then, after the completion of the frame misalignment detection processing, the processing returns to the processing in FIG. 17, resulting in the completion of the omnidirectional image data generation processing.

As described the above, the splicing is performed through the adjustment of the picture position by the comparison of the median in each overlap portion within the omnidirectional image data with the threshold th-MA, in which case, the number assigned to the frame exceeding the threshold is outputted to ensure that only the frame misalignment is appreciated simply, permitting the distinction between the frame misalignment and the misalignment attributed to the lack of run-on.

Incidentally, the omnidirectional image data generation unit 13 shown in each of FIGS. 8, 10, 13, and 15 has applied the processing using the absolute values of the differences in pixel values between the pixels at the predetermined pixel position in the overlap portions, resulting in a need for a vast amount of data processed. Thus, it is also allowable to apply the processing by reducing the amount of data processed through the evaluation of the misalignment width of the overlap portion using only a distance between the pixels in the overlap portion.

Figure 19:
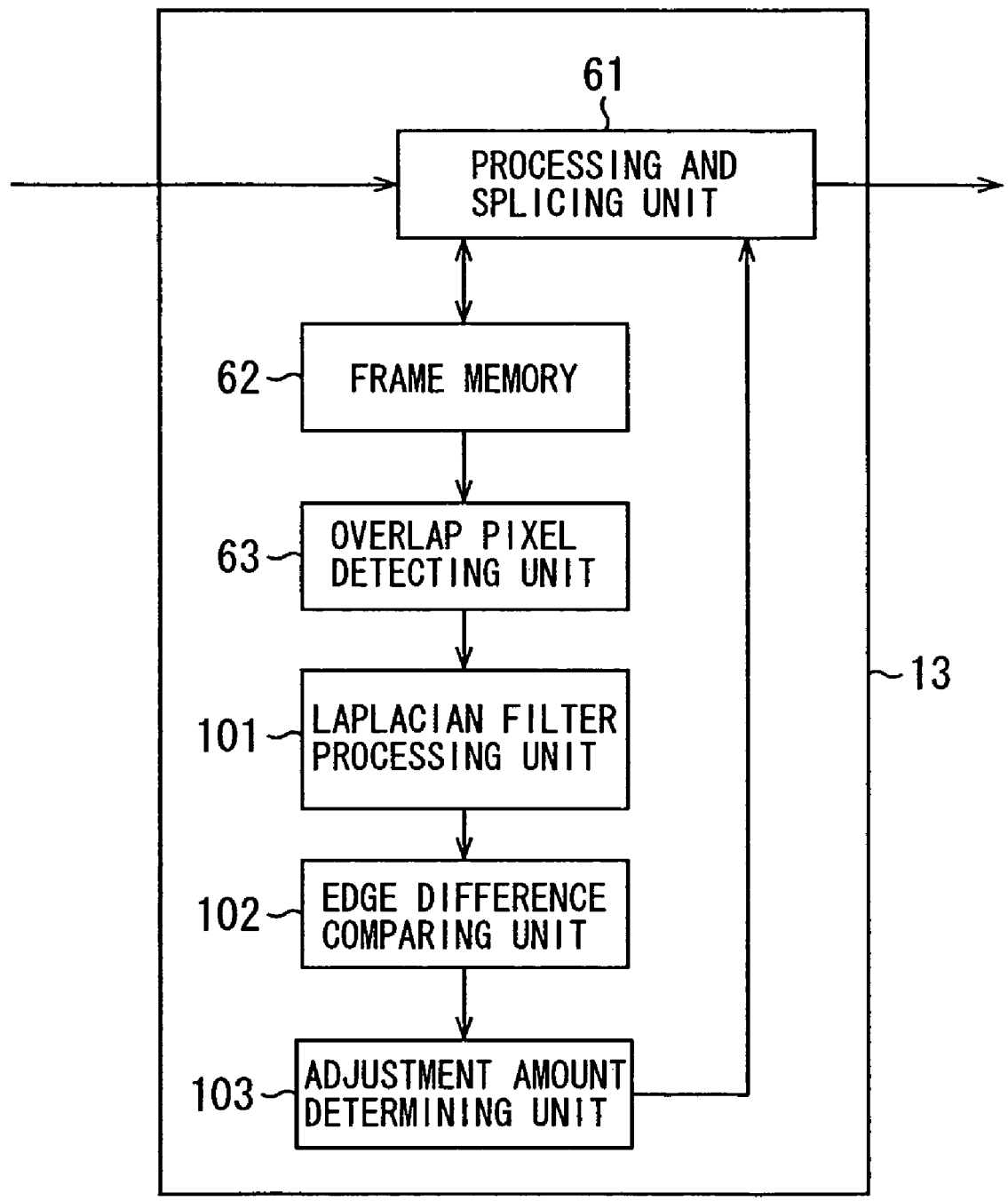
FIG. 19 is a block diagram showing a yet further different configuration of the omnidirectional image data generation unit shown in FIG. 1.

FIG. 19 shows the omnidirectional image data generation unit 13 that is set to generate the omnidirectional image data through the adjustment of the pictures based on the misalignment width of the overlap portion using the distance between the pixels in the overlap portion. Incidentally, in FIG. 19, units corresponding to those in the case of FIG. 8 are given like reference numerals, and the description thereof is properly omitted in the following. The omnidirectional image data generation unit 13 of FIG. 19 is different from the omnidirectional image data generation unit 13 of FIG. 8 in that the former has a Laplacian filter processing unit 101, an edge difference comparing unit 102 and an adjustment amount determining unit 103.

Figure 20:
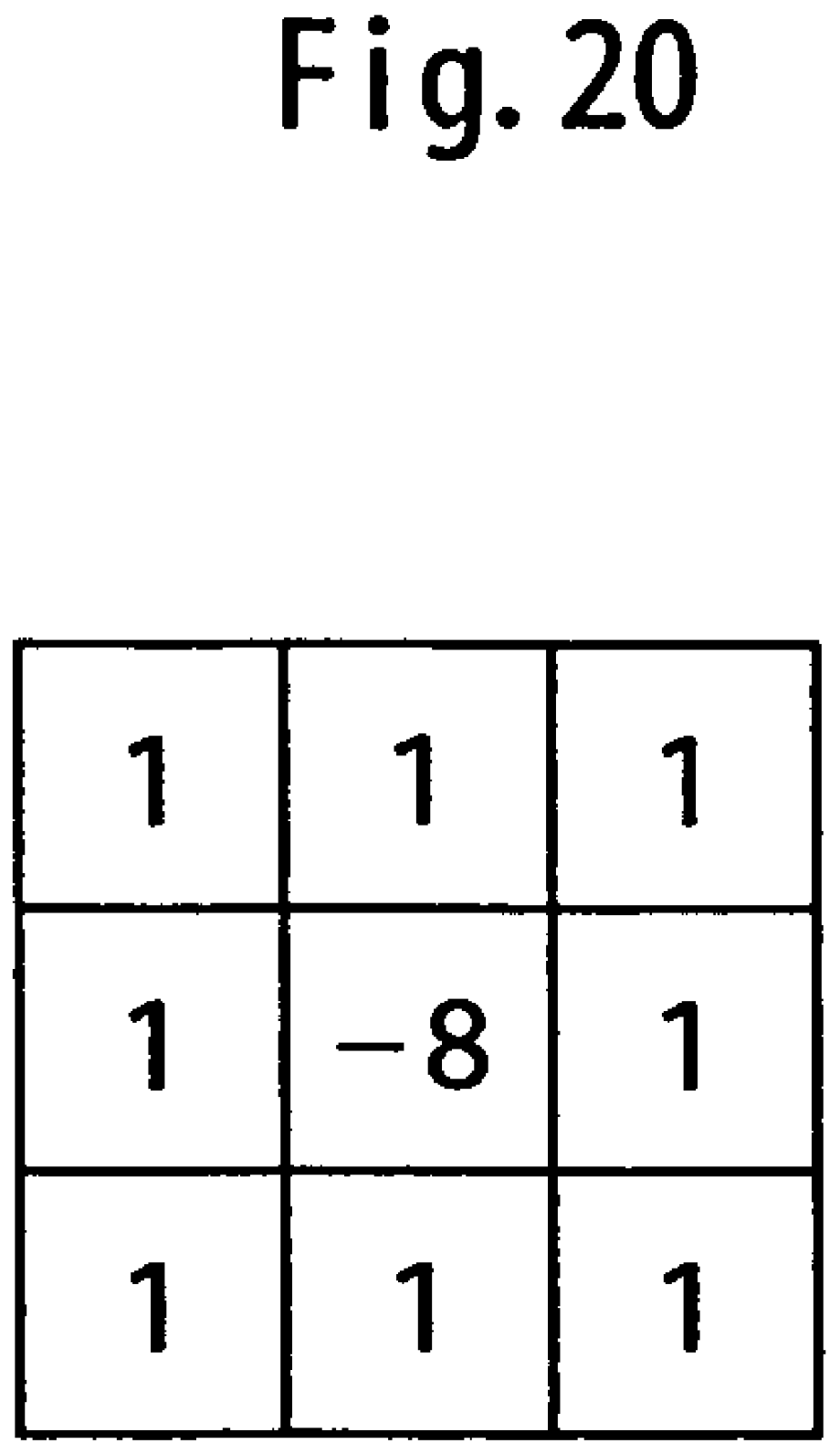
Figure 21:
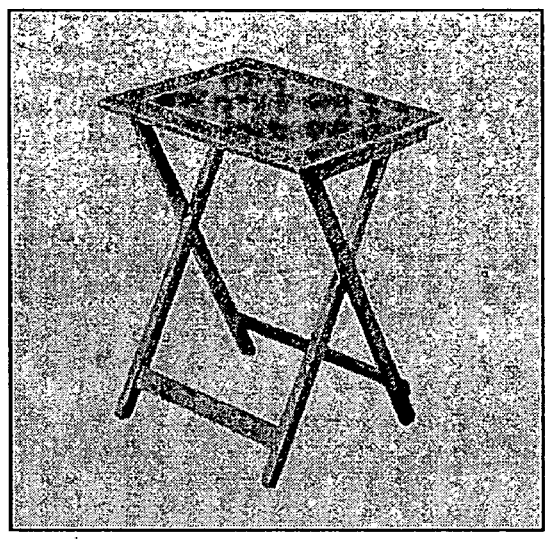
FIG. 21 is a view for illustrating the Laplacian filter.
Figure 22:
FIG. 22 is a view for illustrating the Laplacian filter.

The Laplacian filter processing unit 101 performs the processing with an incorporated Laplacian filter to convert the output, to the edge difference comparing unit 102, the image in the overlap portion into a binary image composed of an edge portion and a portion other than the edge portion. The Laplacian filter is in the form of a 3 by 3 matrix-shaped filter with values of 1, 1, 1, 1, −8, 1, 1, 1, and 1 assigned from a left of an upper stage, as shown in FIG. 20, for instance. An image as shown in FIG. 21, if processed with the Laplacian filter shown in FIG. 20, for instance, is converted into the binary image in which only the pixels of the edge portion in FIG. 21 are turned into white pixels, with other pixels turned into black pixels, as shown in FIG. 22.

Figure 23:
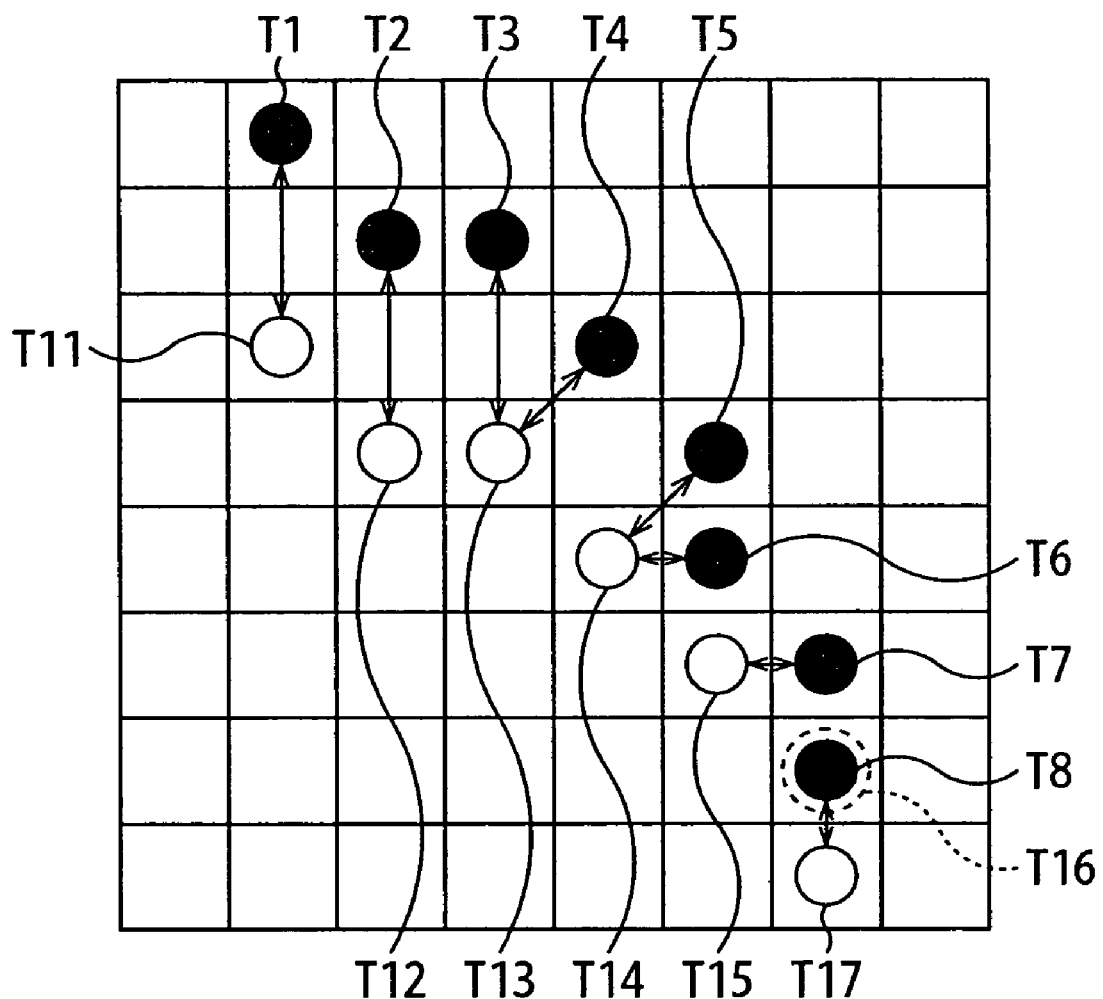
FIG. 23 is a view for illustrating a processing of calculating a misalignment width.

The edge difference comparing unit 102 calculates, provided that the sum of differences in the shortest distance between the pixels in the edge portions is defined as an edge difference FD, the misalignment width of the overlap edge portion processed with the Laplacian filter processing unit for the comparison with a prescribed threshold th-F, and outputs the result of comparison to the adjustment amount determining unit 103. More specifically, it is assumed that there is provided, as shown in FIG. 23, a distribution of the pixels on each edge of the image obtained by processing the overlap portion of the picture P1 with the picture P2 of FIG. 4 by the Laplacian filter processing unit 102. Incidentally, in FIG. 23, pixels T1 to T8 in the form of black dots are assumed to be the edges of the picture P1, and pixels T11 to T17 in the form of white dots are assumed to be the edges of the picture P2.

In this place, the edge difference comparing unit 102 calculates the distance from each of the pixels T1 to T8 of the picture P1 to its corresponding nearest pixel of the picture P2, and further calculates the sum of these distances as the edge difference FD. That is, in the present case, the pixel nearest to the pixel T1 is assumed to be the pixel T11, in which case, a distance |Coordinate T1−Coordinate T11| (which represents the distance between the pixels T1 and T11, and the same is also applied to the following) is calculated, and likewise, distances |Coordinate T2−Coordinate T12|, |Coordinate T3−Coordinate T13|, |Coordinate T4−Coordinate T13|, |Coordinate T5−Coordinate T14|, |Coordinate T6−Coordinate T14|, |Coordinate T7−Coordinate T15|, |Coordinate T8−Coordinate T16|, and |Coordinate T8−Coordinate T17| are calculated, and the sum of these distances is specified as the edge difference FD. Incidentally, when there is no misalignment in the overlap portion, all the distances between the pixels on the edge are assumed to be 0, so that it is also allowable to perform the calculation of more than one distance between the pixels with reference to one pixel.

The adjustment amount determining unit 103 instructs the processing and splicing unit 61 to shift the pictures based on the result of comparison supplied from the edge difference comparing unit 102, and also instructs, depending on the result of comparison, to read out and output, to the MPEG encoder 14, the omnidirectional image data presently contained in the frame memory 62.

Figure 24:
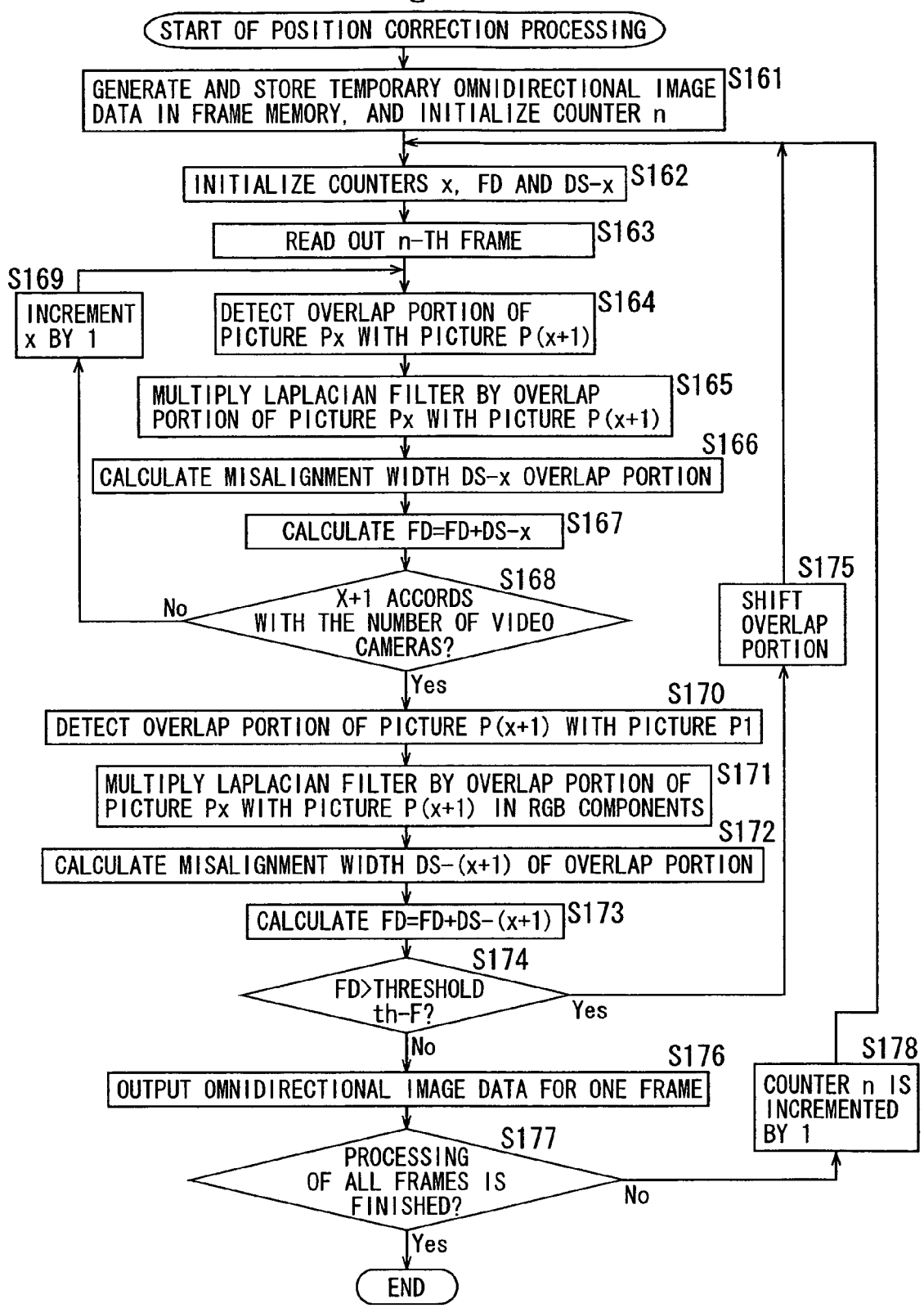
FIG. 24 is a flowchart for illustrating the omnidirectional image data generation processing with the omnidirectional image data generation unit shown in FIG. 15.

The omnidirectional image data generation processing with the omnidirectional image data generation unit 13 of FIG. 19 is now described with reference to a flowchart of FIG. 24.

In Step S161, the processing and splicing unit 61 generates the temporary omnidirectional image data by, after subjecting, frame by frame, the 8 streams supplied from the switching unit 12 to the 90-degree rotation and further the mirror inversion, forming the overlap portions with these streams arranged at the prescribed intervals, and causes the temporary omnidirectional image data to be stored in the frame memory 62, and the counter n that indicates the number of frames is initialized (n=1).

In Step S162, the counter x (1≦x≦7) that represents the number of overlap portions, a counter FD that indicates the edge difference, and a counter DS−x that indicates the misalignment width of the edge portion in the overlap portion are initialized (FD=(DS−x)=0, wherein x=1).

In Step S163, the overlap pixel detecting unit 63 reads out the temporary omnidirectional image data in the corresponding n-th frame from the frame memory 62 with reference to the counter n, and in Step S164, detects the overlap portion of the picture Px with the picture P(x+1) and outputs the result of detection to the Laplacian filter processing unit 101.

In Step S165, the Laplacian filter processing unit 101 applies the processing with the Laplacian filter to the pixels in the overlap portion of the picture Px with the picture P(x+1), and when the input of the image as shown in FIG. 21 is given, for instance, outputs this image to the edge difference comparing unit 102 after the conversion into the binary image to turn only the pixels of the edge portion into the white pixels, with the other pixels turned into the black pixels.

In Step S166, the edge difference comparing unit 102 calculates the misalignment width DS−x of the edge portion based on the supplied overlap portion image obtained after the Laplacian filter processing.

In Step S167, the edge difference comparing unit 102 stores the calculated misalignment width DS−x and the edge difference FD after being cumulatively summed up together.

In Step S168, it is judged whether or not the value (=x+1) obtained by adding 1 to the overlap portion counter x accord with the number of video cameras (8, in this case), and when the judgment of no accord is given, the processing moves on to Step S169 where the counter x is incremented by 1, and returns to the Step S164.

In the Step S168, when it is judged that the value (x=1) obtained by adding 1 to the overlap portion counter x accords with the number of video cameras (8, in this case), the processing moves on to Step S170.

In the Step S170, the pixels in the overlap portion of the picture P(x+1) with the picture P1 are detected, and the result of detection is outputted to the Laplacian filter processing unit 101. In Step S171, the Laplacian filter processing unit 101 applies the processing with the Laplacian filter to the pixels in the overlap portion of the picture P(x+1) with the picture P1, and outputs the image to the edge difference comparing unit 102 after the conversion into the binary image.

In Step S172, the edge difference comparing unit 102 calculates and stores a misalignment width DS−(x+1) of the edge portion based on the supplied overlap portion image obtained after the Laplacian filter processing. In Step S173, the edge difference comparing unit 102 stores the calculated misalignment width DS−(x+1) and the edge difference FD after being cumulatively summed up together.

In Step S174, the edge difference comparing unit 102 compares whether or not the edge difference FD is larger than the prescribed threshold th-F, and when it is judged that the edge difference FD is larger than the threshold th-F, outputs the result of judgment to the adjustment amount determining unit 103, and the processing moves on to Step S175.

In the Step S175, the adjustment amount determining unit 103 supplies, to the processing and splicing unit 61, the amount of adjustment provided for the processing and splicing unit 61 to shift the pictures by the prescribed width, and after, in response to the supplied amount of adjustment, the processing and splicing unit 61 shifts each picture of the n-th frame consisting of the omnidirectional image data contained in the frame memory 62, the processing returns to the Step S162.

In the Step S174, when it is judged that the edge difference FD is not larger than the prescribed threshold th-F, that is, the judgement of the small misalignment width is given for reason that the edge difference FD is smaller than the prescribed threshold th-F, the processing and splicing unit 61 outputs, in Step S176, the omnidirectional image data of the n-th frame to the MPEG encoder 14.

In Step S177, the processing and splicing unit 61 judges whether or not the generation of the picture-adjusted omnidirectional image data of all the frames is finished, and when it is judged that the generation of the overlap portion-adjusted omnidirectional image data of all the frames is not finished, the processing moves on to Step S178.

In the Step S178, the frame counter n is incremented by 1, and the processing returns to the Step S162 to repeat the processing following the Step S162. Further, in the Step S177, when it is judged that the generation of the picture-adjusted omnidirectional image data of all the frames is finished, the processing is completed.

As described the above, the binary processing of the pictures in the overlap portions is performed with the Laplacian filter etc. for the evaluation of the misalignment width of the overlap portion based on the misalignment width of the edge, so that the amount of data processed maybe reduced, as compared with the case where the pixel values of the RGB components are used, permitting an increase in a processing speed, together with the highly accurate generation of the omnidirectional image data.

While any of the omnidirectional image data generation units 13 shown in FIGS. 8, 10, 13, 15, and 19 has applied the processing based on the misalignment width of all the overlap portions, it is also allowable to perform a thinning-out processing such as to apply the calculation of the misalignment width of all the overlap portions as described above to the case of the most highly accurate processing performed with the accuracy specified by some stages or to apply the calculation of an alternate misalignment width within the overlap portions to the case of a high-speed processing performed with the accuracy set somewhat lower.

Further, an increase or a decrease in the accuracy (the accuracy of the misalignment width) for the splicing of the overlap portions may be performed through a change of the setting of the threshold, in which case, the processing speed may be also increased in proportion to the decrease in the accuracy as the threshold is increased, for instance.

While a series of the above processing may be brought into execution with the hardware, it is also allowable to bring the series of the above processing with software. In the case of the execution of the series of the above processing with the software, a program contained in the software is installed from the recording medium into a computer incorporated in the dedicated hardware or a general-purpose personal computer etc. capable of bringing various functions into execution through an installation of various programs, for instance.

FIG. 25 shows a configuration of one embodiment of the personal computer applied to implement the omnidirectional image data generation unit 13 of FIGS. 8, 10, 13, 15, or 19 with the software. A CPU 201 of the personal computer controls the overall operation of the personal computer. When the input of an instruction is given from the user through an input unit 206 composed of a keyboard and a mouse etc. via a bus 204 and an input/output interface 205, the CPU 201 executes a program stored in a ROM (Read Only Memory) 202 in response to the instruction. Alternatively, the CPU 201 executes, through a loading into a RAM (Random Access Memory) 203, the program installed in a storage unit 208 after being read out from a magnetic disc 221, an optical disc 222, a magneto-optical disc 223 or a semiconductor memory 224 connected to a drive 210. This allows the function of the above omnidirectional image data generation unit 13 to be implemented with the software. Further, the CPU 201 controls a communication unit 209 to establish a communication with the outside for the execution of an exchange of data.

The recording medium containing the program is configured with not only a program-contained package media formed with the magnetic disc 221 (including a flexible disc), the optical disc 222 (including a CD-ROM (Compact Disc-Read Only Memory) and a DVD (Digital Versatile Disk)), the magneto-optical disc 223 (including a MD (Mini-Disc)) or the semiconductor memory 22 etc. that is distributed separately from the computer to provide the program for the user, but also units provided for the user in the form of units preliminarily incorporated into the computer, such as the ROM 202 containing the program and a hard disc contained in the storage unit 208.

Incidentally, it is to be understood that in the present specification, the Steps describing the program recorded in the recording medium involve not only the processing performed in time series in the described sequence but also the processing not always performed in time series but in parallel or individually.

Further, it is also to be understood that in the present specification, the system is given in the form of the whole apparatus composed of more than one unit.

INDUSTRIAL APPLICABILITY

The present invention enables the omnidirectional image to be generated through the exact overlapping of the edges of the pictures captured at more than one visual point with high accuracy.

The invention claimed is:

1. An image processing apparatus for generating a wide-angle picture by overlapping three or more pictures captured at different visual points, each picture including a part of at least one other picture, the image processing apparatus comprising:

an overlap detecting means for detecting an overlap portion of a first picture and a second picture within the wide-angle picture;

a comparing means for comparing pixel values between pixels of the first and second pictures in each of the overlap portions within the wide-angle picture;

a splicing means for performing a splicing by shifting the overlap portions based on the comparison by the comparing means;

a difference calculating means for calculating the absolute value of differences in pixel values, for each color component, between the first and second picture pixels identical in position on the wide-angle picture in each of the overlap portions, wherein the comparing means compares the sum of the absolute values from all of the overlap portions with a first predetermined threshold; and a logarithm transformation means for performing a logarithm transformation of the sum, wherein the comparing means compares the logarithm transformation of the sum with a second predetermined threshold.

2. An image processing apparatus for generating a wide-angle picture by overlapping three or more pictures captured at different visual points, each picture including a part of at least one other picture, the image processing apparatus comprising:

an overlap detecting means for detecting an overlap portion of a first picture and a second picture within the wide-angle picture;

a comparing means for comparing pixel values between pixels of the first and second pictures in each of the overlap portions within the wide-angle picture;

a splicing means for performing a splicing by shifting the overlap portions based on the comparison by the comparing means;

a difference calculating means for calculating the absolute value of differences in pixel values, for each color component, between the first and second picture pixels identical in position on the wide-angle picture in each of the overlap portions, wherein the comparing means compares the sum of the absolute values from all of the overlap portions with a first predetermined threshold; and a median detecting means for calculating the median value, for each color component, of the absolute values in the overlap portions, wherein the comparing means compares the sum of the median values with a second predetermined threshold.

3. A computer-readable media storing a program for causing a computer to execute a method for generating a wide-angle picture by overlapping three or more pictures captured at different visual points, each picture including a part of at least one other picture, the method comprising:

detecting an overlap portion of a first picture with a second picture within the wide-angle picture;

comparing pixel values between pixels of the first and the second pictures in each of the overlap portions in the wide-angle picture;

performing a splicing by shifting the overlap portions based on the comparison obtained by a processing in the comparison step;

calculating the absolute value of differences in pixel values, for each color component, between the first and the second picture pixels identical in position on the wide-angle picture in each of the overlap portions;

calculating the median value, for each color component, of the absolute values; and comparing the sum of the median values with a predetermined threshold.

* * * * *